(12) United States Patent
Mokuya et al.

(10) Patent No.: US 7,528,982 B2
(45) Date of Patent: May 5, 2009

(54) PRINTER, PRINT INSTRUCTION TERMINAL, PRINTING SYSTEM, PRINTING PROGRAM, AND PRINTING METHOD

(75) Inventors: Senichi Mokuya, Suwa (JP); Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 984 days.

(21) Appl. No.: 10/924,243

(22) Filed: Aug. 20, 2004

(65) Prior Publication Data

US 2005/0069364 A1    Mar. 31, 2005

(30) Foreign Application Priority Data

Aug. 22, 2003 (JP) .............................. 2003-298810
Aug. 22, 2003 (JP) .............................. 2003-298811
May 26, 2004 (JP) .............................. 2004-156309

(51) Int. Cl.
G06K 15/00 (2006.01)
G06F 15/00 (2006.01)
G06K 9/46 (2006.01)
G06K 9/36 (2006.01)
G03G 15/00 (2006.01)

(52) U.S. Cl. ................ 358/1.16; 358/1.2; 382/243; 382/232; 382/233; 399/403

(58) Field of Classification Search ............... 358/1.16, 358/1.2; 382/243, 232, 233; 399/403
See application file for complete search history.

(56) References Cited

U.S. PATENT DOCUMENTS 5,984,446 A * 11/1999 Silverbrook ................. 347/3
6,313,847 B1 * 11/2001 Carlsen ..................... 345/629
2004/0012802 A1 * 1/2004 Allen et al. ................ 358/1.13

FOREIGN PATENT DOCUMENTS

JP    09/039312    2/1997

* cited by examiner

Primary Examiner—Edward L Coles
Assistant Examiner—Thomas J Lett
(74) Attorney, Agent, or Firm—Harness, Dickey & Pierce, P.L.C.

(57) ABSTRACT

A printer is provided that stores raw data. Printing is performed with the material data merged together in accordance with a print instruction from a print instruction terminal. The material data is rendered in advance and then stored in a compressed form. However, part of the material data stored in the compressed form is decompressed to its original size and stored in a decompressed form. This allows a large amount of material data to be stored in a compressed form while also allowing the stored decompressed material data to be immediately used. As such, the time required to decompress frequently used material data is eliminated. This advances the printing start time to allow high-speed printing.

9 Claims, 16 Drawing Sheets

| NAME OF MATERIAL DATA | FREQUENCY OF USE (TIMES) |
|---|---|
| Data 000001 | 12 |
| Data 000021 | 321543 |
| ○ | ○ |
| Data 999999 | 321 |

| CONTENT | DESCRIPTION |
|---|---|
| Data002512 (10,10) | MATERIAL-DATA-KIND INSTRUCTION DATA MATERIAL-DATA-POSITION INSTRUCTION DATA |
| Data000021 (400,250) | MATERIAL-DATA-KIND INSTRUCTION DATA MATERIAL-DATA-POSITION INSTRUCTION DATA |
| ABCDEFG ⊲0123456 (10,250) | CHARACTER STRING DATA CHARACTER-STRING-POSITION INSTRUCTION DATA |

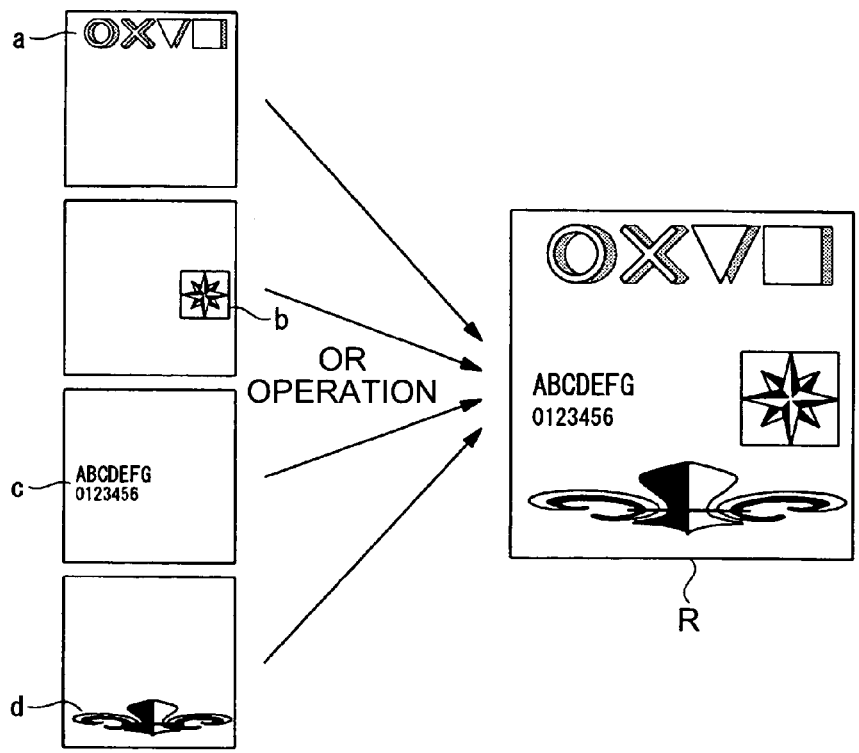

FIG. 15

| | CONTENT | DESCRIPTION |
|---|---|---|
| 301 | Data002512 (10,10) | MATERIAL-DATA-KIND INSTRUCTION DATA MATERIAL-DATA-POSITION INSTRUCTION DATA |
| 302 | Data000021 (400,250) | MATERIAL-DATA-KIND INSTRUCTION DATA MATERIAL-DATA-POSITION INSTRUCTION DATA |
| 303 | ABCDEFG ◁0123456 (10,250) | CHARACTER STRING DATA CHARACTER-STRING-POSITION INSTRUCTION DATA |
| 304 | IMAGE DATA (10,600) REIGISTER_ COMPRESS | IMAGE DATA IMAGE DATA POSITION REGISTRATION INSTRUCTION AS NEW MATERIAL DATA (COMPRESS: COMPRESSED FORM) (DECOMPRESS: DECOMPRESSED FORM) |

|     | NAME OF RAW IMAGE DATA | SIZE (BYTE) | DATA CONDITION | DECOMPRESSED DATA SIZE (BYTE) |
|---|---|---|---|---|
| 101 | Data 002512 | 83,955 | COMPRESS | 656,846 |
| 102 | Data 000021 | 14,182 | COMPRESS | 2,166,838 |
| 103 | Data 001232 | 17,125 | DECOMPRESS | — |
|     | : | : | : | : |
| 10X | Data 999999 |   |   | — |

FIG. 17

|     | KIND OF INSTRUCTION | TRANSMISSION DATA |
|---|---|---|
| 201 | DECOMPRESS MATERIAL DATA | NAME OF MATERIAL DATA : Data001232<br>INSTRUCTION : DECOMPRESS |
| 202 | COMPRESS MATERIAL DATA | NAME OF MATERIAL DATA : Data001232<br>INSTRUCTION : COMPRESS |
| 203 | DELETE MATERIAL DATA | NAME OF MATERIAL DATA : Data001232<br>INSTRUCTION : DELETE |

FIG. 18

PRINTER, PRINT INSTRUCTION TERMINAL, PRINTING SYSTEM, PRINTING PROGRAM, AND PRINTING METHOD

RELATED APPLICATIONS

This application claims priority to Japanese Patent Application Nos. 2003-298810 filed Aug. 22, 2003, 2003-298811 filed Aug. 22, 2003, and 2004-156309 filed May 26, 2004 which are hereby expressly incorporated by reference herein in their entirety.

BACKGROUND

1. Technical Field

The present invention relates to a printer for printing in accordance with a print instruction from a print instruction terminal such as a personal computer (PC) and, more particularly, it relates to a printer that stores a plurality of print material data to provide the material data for printing, a print instruction terminal, a printing system, a printing program, and a printing method therefore.

2. Background Art

Since document data created by print instruction terminals are not generally printed by printers if not processed, they are printed after being converted to raster image data in which dot-by-dot color information such as Bit MaP are enumerated.

The conversion process from document data to raster image data is generally referred to as rendering. With general inkjet printers, the conversion process is performed by a printer driver incorporated in a print instruction terminal on the side of the print instruction terminal. With general laser printers, it is performed on the side of a printer after document data is temporarily converted to a small-size intermediate language such as a page description language (PDL) on the side of a print instruction terminal.

Rendering requires a vast amount of information processing, posing the disadvantage of taking a long time after a user provides a print instruction on the side of the print instruction terminal until printing is actually started. The disadvantage appears remarkable particularly for print data with a high data volume, such as a color image, and for a print instruction terminal and a printer itself with low information processing power.

In order to increase the speed of a printing process, for example, printing methods referred to as "overlay printing" and "business form printing" have been proposed, as shown in JP-A-9-39312.

The printing method referred to as "overlay printing" is as follows. Material data that is frequently used in printing, such as a company name, rule lines, and a logo mark, is stored in a printer in advance and, at the time of printing using the material data, printing is performed using the material data stored in the printer merely by providing a print instruction to designate the material data, thereby reducing the amount of data transferred of the entire document to be actually printed to advance the printing start time, thus increasing printing speed. The printing method that is referred to as "overlay printing" remarkably offers the above advantage particularly for material data with a high data volume such as a color image.

In order to store material data on the side of a printer, it is necessary to provide a storage device only for material data, such as a semiconductor memory and a hard disk drive (HDD), in the printer. The storage devices are however limited in storage capacity. Accordingly, it is desirable not to store the material data in an unprocessed form but to store it after reducing its size using data compression techniques such as ZIP and Joint Photographic Experts Group (JPEG).

When raster image data or PDL is sent to a printer after being compressed on the side of a print instruction terminal, a data transfer amount is reduced, allowing high-speed printing.

However, in order to practically use the material data compressed and stored or the material data compressed and transferred in that way as print data on the side of a printer, it is necessary to temporarily and completely restore (hereinafter, referred to as "decompress" as appropriate) the compressed and stored material data to its original size on the side of the printer. The data decompressing (also referred to as expanding or unarchiving) process generally takes a long time, resulting in decreasing by half the advantages of high-speed printing and efficient storage due to the reduction in the amount of data transferred.

When the decompressed material data is stored without being processed, the storage capacity of a storage device gets is quickly consumed. It is therefore desirable to store it after recompression. However, this requires wasteful processing for material data that may be used frequently.

With irreversible compressed data as in JPEG which is a standard static-image compression technology, the repetition of compression will cause data loss to degrade image quality. It is therefore unfavorable to repeat compression.

Accordingly, the present invention has been made to effectively solve the above problems. It is an object of the invention to provide a new printer achieving high-speed printing and a print instruction terminal, a printing system, a printing program, and a printing method for the same.

It is another object of the invention to provide a new printer and a print instruction terminal capable of realizing the optimum data manipulation according to the frequency of use and character of the material data, and a printing system, a printing program, and a printing method of the same.

SUMMARY

In order to solve the above problems, a printer of Aspect 1 includes: a data storage section for storing rendered material data; a data merging section for merging the material data stored in the data storage section in accordance with a print instruction to produce print data; and a print output section for executing printing using the print data produced by the data merging section.

With such a structure, the data storage section stores rendered material data and, when a print instruction to use the material data is given from a print instruction terminal etc., the data merging section immediately merges the material data to produce print data, and the print output section performs printing using the print data.

When the pre-rendered material data is stored in the data storage section of the printer, the time necessary for rendering the material data being used can be saved, thus remarkably advancing the printing start time. This allows high speed printing. The "material data" in the present invention denotes the elements of "print data" such as "image data" and "text data" (this also applies to the following "printer," "print instruction terminal," "printing system," "printing program," and "printing method").

The printer of Aspect 2 according to Aspect 1, further includes a material-data compression/decompression section for compressing or decompressing the rendered material data.

With such a structure, when compressed material data is sent, the material-data compression/decompression section decompresses the material data by the printer, allowing the material data to be used as print data.

Since the material-data compression/decompression section may also compress the material data and the data storage section stores the compressed material data, the limited storage space can be saved to allow storage of a great amount of material data.

The printer of Aspect 3 according to Aspect 1, further includes a material-data compression/decompression section for compressing or decompressing the rendered material data. The data storage section includes a compressed-data storage section for storing compressed material data and a decompressed-data storage section for storing decompressed material data.

With such a structure, in addition to the advantages of Aspects 1 and 2, since some frequently used material data of the stored material data are stored in the decompressed-data storage section in a decompressed state without compression, the time necessary for decompression of the material data can also be saved, further advancing the printing start time using the material data.

A printer of Aspect 4 includes: a material-data compression/decompression section for compressing or decompressing rendered material data; a data storage section for storing the rendered material data; a data merging section for merging the material data stored in the data storage section in accordance with a print instruction to produce print data; a print output section for performing printing using the print data produced by the data merging section; and a material-data manipulation section for manipulating the material data.

The data storage section includes a compressed-data storage section for storing compressed material data and a decompressed-data storage section for storing decompressed material data.

The material-data manipulation section deletes the material data stored in the data storage section and stores the material data in the compressed-data storage section or the decompressed-data storage section.

With such a structure, in addition to the advantages of Aspects 1 to 3, since the material-data manipulation section can freely delete the material data stored in the data storage section and store the material data in the compressed-data storage section or the decompressed-data storage section, optimum data manipulation can be made according to the frequency of use and character of the material data.

In the printer of Aspect 5 according to Aspect 4, the material-data manipulation section stores the material data in the decompressed-data storage section in descending order of a total usage count in the data merging section or stores the material data whose total usage count in the data merging section is larger than a specified value in the decompressed-data storage section.

Since only material data that is used frequently for printing can be appropriately selected from the material data stored in the data storage section and stored in the decompressed-data storage section, a large amount of material data can be stored efficiently in the data storage section and material data that is actually necessary for producing print data can be used immediately, allowing the time necessary for decompressing material data to be saved to achieve high-speed printing.

In the printer of Aspect 6 according to Aspect 4 or 5, when the amount of material data stored in the decompressed-data storage section has exceeded a certain amount at the time of storing the new material data into the decompressed-data storage section, the material-data manipulation section compares the total usage count of material data that is used the least of the material data stored in the decompressed-data storage section with the total usage count of material data to be newly stored, wherein when the total usage count of the material data to be newly stored is larger, the new material data is stored in place of the material data that is used the least.

Accordingly, when the storage space of the decompressed-data storage section becomes tight, material data that comes into frequent use can be stored in a decompressed state in place of unnecessary decompressed material data that is not so frequently used. The limited storage space of the decompressed-data storage section can therefore be used efficiently.

In the printer of Aspect 7 according to Aspect 4, the material-data manipulation section manipulates the condition of the material data in accordance with instructions.

When the material data is manipulated in accordance with the instruction from the print instruction terminal etc., the user etc. can freely select frequently used material data or material data that is not suitable for repeated compression to register it in the decompressed-data storage section. This allows optimum data manipulation according to the frequency of use and characteristics of material data.

In the printer of Aspect 8 according to one of Aspects 1 to 7, the material data is image data.

Image data such as a photograph and an illustration are generally extremely large in data size as compared with text data and layout data. The use of the massive image data as the material data of the invention will offer the advantage of remarkably increasing storage efficiency and decreasing the time for compression and decompression.

A print instruction terminal of Aspect 9 provides a print instruction to the printer described in one of Aspects 1 to 8 and includes a material-data-list display section for displaying a material-data list of the material data stored in the data storage section of the printer.

When the print instruction terminal for sending a print instruction to the printer includes the material-data-list display section, the user can easily and accurately grasp the kind and storage condition of the material data stored in the printer, that is, whether the material data is stored in a compressed state or decompressed state, on the print instruction terminal.

The print instruction terminal of Aspect 10 according to Aspect 9, further includes: a material-data-list manipulation section for manipulating the material data displayed on the material-data list.

Since the invention includes the material-data-list manipulation section in addition to the structure of Aspect 9, the user etc. can directly apply a desired manipulation to the material data by using an input device etc. of the print instruction terminal, thus improving the ease-of-use of the material data.

A print instruction terminal of Aspect 11 provides a print instruction to the printer described in one of Aspects 3 to 8, and includes: a compressed-data display section corresponding to a compressed-data storage section of a data storage section of the printer; a decompressed-data display section corresponding to a decompressed-data storage section of the data storage section of the printer; an icon production section for producing icons corresponding to material data stored in the compressed-data storage section or the decompressed-data storage section; and an icon display section for displaying the icons produced by the icon production section in the compressed-data display section or the decompressed-data display section depending on the position where the corresponding material data is stored.

With such a structure, when the compressed-data storage section and the decompressed-data storage section of the data storage section of the printer stores material data in a compressed state and a decompressed state, respectively, an icon production section produces icons that correspond to the material data and the icon display section displays the icons in the compressed-data display section corresponding to the compressed-data storage section or the decompressed-data display section corresponding to the decompressed-data storage section. Accordingly, the user can easily grasp the kind, number, the storage condition, etc. of the material data stored in the data storage section of the printer merely by viewing the icons displayed on the monitor of the print instruction terminal.

The print instruction terminal of Aspect 12 according to Aspect 11, further includes: an icon operating section for moving the icon between the compressed-data display section and the decompressed-data display section, registering, or deleting the icon; and a manipulation instruction section for instructing a material-data manipulation section of the printer to manipulate the material data corresponding to the icon in synchronization with the operation of the icon by the icon operating section.

Accordingly, when the user etc. operates the icon displayed on the monitor using an input device such as a mouse or a keyboard of the print instruction terminal, the icon operating section moves the icon between the compressed-data display section and the decompressed-data display section, registers or deletes the icon in accordance with the operation, and the manipulation instruction section gives instructions to the material-data manipulation section of the printer in synchronization with the operation of the icon by the icon operating section. Thus, the manipulation and management of the material data stored in the data storage section of the printer can easily be performed.

A printing system of Aspect 13 includes the printer according to one of Aspects 1 to 8 and the print instruction terminal according to one of Aspects 9 to 12.

Such a structure allows high-speed printing, storage of a large amount of material data, and the optimum data manipulation according to the frequency of use and characteristic of the material data.

A printing program of Aspect 14 allows a computer of a printer to serve as: data storage means for storing rendered material data; data merging means for merging the material data stored by the data storage means in accordance with a print instruction to produce print data; and print output means for performing printing by using the print data produced by the data merging means.

This remarkably advances the printing start time to allow high-speed printing, as in Aspect 1, and also makes full use of the function by using a computer system which is generally installed in most printers, thus allowing significant cost reduction as compared with the case in which new dedicated hardware is provided.

A printing program of Aspect 15 according to Aspect 14 allows the computer of the printer to serve as: material-data compression/decompression means for compressing or decompressing rendered material data.

This allows a large amount of material data to be stored efficiently, as in Aspect 2, and makes full use of the function using a computer system provided to a printer, as in Aspect 14, achieving high economical efficiency.

A printing program of Aspect 16 according to Aspect 14 allows the computer of the printer to serve as material-data compression/decompression means for compressing or decompressing rendered material data; and the data storage means to serves as compressed-data storage means for storing the compressed material data and decompressed-data storage means for storing the decompressed material data.

This allows the time necessary for compressing and decompressing the material data to be saved, as in Aspect 3, thus further advancing the printing start time for the material data, and providing the function by using a computer system installed in the printer, as in Aspect 13, thus achieving high economical efficiency.

A printing program of Aspect 17 allows the computer of the printer to serve as: material-data compression/decompression means for compressing or decompressing rendered material data; data storage means for storing the rendered material data; data merging means for merging the material data stored by the data storage means in accordance with a print instruction to produce print data; and print output means for performing printing by using the print data produced by the data merging means; and material-data manipulation means for manipulating the material data. The program allow the data storage means to serve as compressed-data storage means for storing the compressed material data and decompressed-data storage means for storing the decompressed material data, and allows the material-data manipulation means to delete the material data stored by the data storage means and store the material data in the compressed-data storage means or the decompressed-data storage means.

This allows the optimum data manipulation according to the frequency of use and characteristics of material data, as in Aspect 4, and provides the function by using a computer system installed in the printer, as in Aspect 14, thus achieving high economical efficiency.

A printing program of Aspect 18 according to Aspect 17 allows the material-data manipulation means to store the material data in the decompressed-data storage means in descending order of total usage count in the data merging section or to store the material data whose total usage count in the data merging section is larger than a specified value in the decompressed-data storage means. This allows the time necessary for decompressing the material data to be saved to achieve high-speed printing, as in Aspect 5, and provides the function by using the computer system installed in the printer, as in Aspect 14, thus achieving high economical efficiency.

A printing program of Aspect 19 according to Aspect 17 or 18 allows the material-data manipulation means to serve as follows. When the amount of material data stored in the decompressed-data storage section has exceeded a certain amount at the time of storing the new material data into the decompressed-data storage section, the material-data manipulation section compares the total usage count of material data that is used the least of the material data stored in the decompressed-data storage section with the total usage count of material data to be newly stored, wherein when the total usage count of the material data to be newly stored is larger, the new material data is stored in place of the material data that is used the least.

Accordingly, the limited storage space of the decompressed-data storage section can be used efficiently, as in Aspect 6, and the function can be achieved by using the computer system installed in the printer, as in Aspect 14, thus achieving high economical efficiency.

A printing program of Aspect 20 according to Aspect 17 allows the material-data manipulation section to manipulate the material data in accordance with instructions. This allows optimum data manipulation according to the frequency of use and characteristics of material data, as in Aspect 7, and achieves the function by using the computer system installed in the printer, as in Aspect 14, thus achieving high economical efficiency.

In a printing program of Aspect 21 according to one of Aspects 14 to 20, the material data is image data.

This offers the advantage of remarkably increasing storage efficiency and decreasing the time for compression and decompression, as in Aspect 8, and achieves the function by using the computer system installed in the printer, as in Aspect 14, thus achieving high economical efficiency.

A printing program of Aspect 22 is used in a print instruction terminal for sending a print instruction to the printer according to one of Aspects 1 to 8, wherein the program allows a computer of the print instruction terminal to serve as material-data-list display means for displaying a material-data list for the material data stored in a data storage section of the printer.

Accordingly, the user can easily and accurately grasp the kind and storage condition of the material data stored in the printer on the print instruction terminal, as in Aspect 9, and the function can be achieved by using a computer system installed in the print instruction terminal, thus achieving high economical efficiency.

A printing program of Aspect 23 according to Aspect 22 allows the computer of the print instruction terminal to serve as: material-data-list manipulation means for manipulating material data displayed on the material-data list; and manipulation instruction means for instructing a material-data manipulation section of the printer in synchronization with the manipulation of the material data by the material-data-list manipulation means.

This improves the ease-of-use of the material data, as in Aspect 10, and achieves the function by using the computer system installed in the print instruction terminal, as in Aspect 22, thus achieving high economical efficiency.

A printing program of Aspect 24 is used in a print instruction terminal for sending a print instruction to the printer according to one of Aspects 3 to 8, wherein the program allows a computer of the print instruction terminal to serve as: compressed-data display means corresponding to a compressed-data storage section of a data storage section of the printer; decompressed-data display means corresponding to a decompressed-data storage section of the data storage section of the printer; icon production means for producing icons corresponding to material data stored in the compressed-data storage section or the decompressed-data storage section; and icon display means for displaying the icons produced by the icon production means in the compressed-data display means or the decompressed-data display means depending on the position where the corresponding material data is stored.

Accordingly, the user etc. can easily grasp the kind, number, storage condition, etc. of the material data stored in the data storage section of the printer merely by viewing the icon displayed on the monitor of the print instruction terminal, as in Aspect 11. Also, the function can be achieved by using the computer system installed in the print instruction terminal, as in Aspect 22, thus achieving high economical efficiency.

A printing program of Aspect 25 according to Aspect 24 allows the computer of the print instruction terminal to serve as: icon operating means for moving the icon between the compressed-data display means and the decompressed-data display means, registering, or deleting the icon; and manipulation instruction means for instructing a material-data manipulation section of the printer to manipulate the material data corresponding to the icon in synchronization with the operation of the icon by the icon operating means.

Thus, the manipulation and management of the material data stored in the data storage section of the printer can easily be performed, as in Aspect 12, and the function can be achieved by using the computer system installed in the print instruction terminal, as in Aspect 22, thus achieving high economical efficiency.

A printing method of Aspect 26 includes the steps of: storing a plurality of pre-rendered material data in a data storage section of a printer; merging the material data stored in the data storage section in accordance with a print instruction from a print instruction terminal to produce print data; and performing printing by using the produced print data by the printer.

This allows the time necessary for rendering material data being used to be saved, thus remarkably advancing the printing start time to allow high speed printing, as in Aspect 1.

In a printing method of Aspect 27 according to Aspect 26, the rendered material data is compressed or decompressed by the printer. Accordingly, when compressed material data is sent, the material-data compression/decompression section decompresses the material data by the printer, allowing the material data to be used as print data, as in Aspect 2. Since the material-data compression/decompression section may also compress the material data and stores the compressed material data in the data storage section, the limited storage space can be saved to allow storage of a large amount of material data.

In a printing method of Aspect 28 according to Aspect 26, the data storage section includes a compressed-data storage section for storing compressed material data and a decompressed-data storage section for storing decompressed material data, wherein the method includes the steps of: rendering the plurality of material data; compressing the rendered material data; storing the compressed material data in the compressed-data storage section; and storing part of the stored compressed material data in the decompressed-data storage section of the data storage section in a state in which it is decompressed to the original size.

Accordingly, the time necessary for compression or decompression of the material data can also be saved, further advancing the printing start time using the material data.

A printing method of Aspect 29 according to Aspect 28, comprising the steps of deleting the material data stored in the data storage section and storing the material data in the compressed-data storage section or the decompressed-data storage section.

This facilitates deletion of the material data stored in the data storage section and storage of the material data in the compressed-data storage section or the decompressed-data storage section, allowing optimum data manipulation according to the frequency of use and character of the material data, as in Aspect 4.

In a printing method of Aspect 30 according to Aspect 29, the material data is stored in the decompressed-data storage section in descending order of total usage count in the data merging section.

Accordingly, a large amount of material data can be stored efficiently in the data storage section and material data that is actually necessary for producing print data can be used immediately, as in Aspect 5, allowing the time necessary for decompressing material data to be saved to achieve high-speed printing.

In a printing method of Aspect 31 according to Aspect 29 or 30, when the amount of material data stored in the decompressed-data storage section has exceeded a certain amount at the time of storing the new material data into the decompressed-data storage section, the total usage count of material data that is used the least of the material data stored in the decompressed-data storage section is compared with the total usage count of material data to be newly stored, wherein when the total usage count of the material data to be newly stored is larger, the new material data is stored in place of the material data that is used the least.

Accordingly, when the storage space of the decompressed-data storage section becomes tight, material data that comes into frequent use can be stored in a decompressed state in place of unnecessary decompressed material data that is not so frequently used, as in Aspect 6. The limited storage space of the decompressed-data storage section can therefore be used efficiently.

In a printing method of Aspect 32 according to Aspect 31, the condition of the material data is manipulated in accordance with instructions.

Accordingly, the user etc. can freely select frequently used material data or material data that is not suitable for repeated compression to register it in the decompressed-data storage section, as in Aspect 7. This allows the optimum data manipulation according to the frequency of use and characteristics of material data.

In a printing method of Aspect 33 according to one of Aspects 28 to 32, image data is used as the material data.

The use of the massive image data as the material data of the invention will offer the advantage of remarkably increasing storage efficiency and decreasing the time for compression and decompression, as in Aspect 8.

In a printing method of Aspect 34 according to Aspect 28, a material-data list of the material data stored in the data storage section of the printer is displayed on the print instruction terminal.

Accordingly, the user etc. can easily and accurately grasp the kind and storage condition of the material data stored in the printer, that is, whether the material data is stored in a compressed state or decompressed state, on the print instruction terminal, as in Aspect 9.

In a printing method of Aspect 35 according to Aspect 34, the material data stored in the data storage section of the printer is manipulated in synchronization with the manipulation of the material data displayed on the material-data list.

Accordingly, the user etc. can directly apply a desired manipulation to the material data by using an input device etc. of the print instruction terminal, as in Aspect 10, thus improving the ease-of-use of the material data.

A printing method of Aspect 36 according to Aspect 28 includes the steps of: displaying a compressed-data display area corresponding to the compressed-data storage section of the data storage section of the printer and a decompressed-data display area corresponding to the decompressed-data display section of the data storage section of the printer on a display of the print instruction terminal; producing icons corresponding to the material data stored in the compressed-data storage section or the decompressed-data storage section; and displaying the icons in the compressed-data display area or the decompressed-data display area depending on the position where the corresponding material data is stored.

Accordingly, the user etc. can easily grasp the kind, number, storage condition, etc. of the material data stored in the data storage section of the printer merely by viewing the icon displayed on the monitor of the print instruction terminal, as in Aspect 11.

A printing method of Aspect 37 according to Aspect 36 further includes the step of instructing a material-data manipulation section of the printer to manipulate the material data corresponding to an icon in synchronization with the operations of moving the icon between the compressed-data display area and the decompressed-data display area, registering, or deleting the icon.

Accordingly, when the user etc. operates the icon displayed on the monitor using an input device such as a mouse or a keyboard of the print instruction terminal, the icon operating section moves the icon between the compressed-data display section and the decompressed-data display section, registers, or deletes the icon in accordance with the operation, and the manipulation instruction section gives instructions to the material-data manipulation section of the printer in synchronization with the operation of the icon. Thus, the manipulation and management of the material data stored in the data storage section of the printer can easily be performed.

BRIEF DESCRIPTION OF THE DRAWINGS

FIG. 15 is a schematic diagram of an image composed of laid-out material data.

FIG. 16 is a table of the relationship between material data and their kind- and position-instruction data.

FIG. 17 is a diagram of an example of a material-data list.

FIG. 18 is a table of examples of data manipulation instructions given from a print instruction terminal to a printer.

DETAILED DESCRIPTION

The best mode for carrying out the present invention will be specifically described hereinbelow with reference to the drawings.

Figure 1:
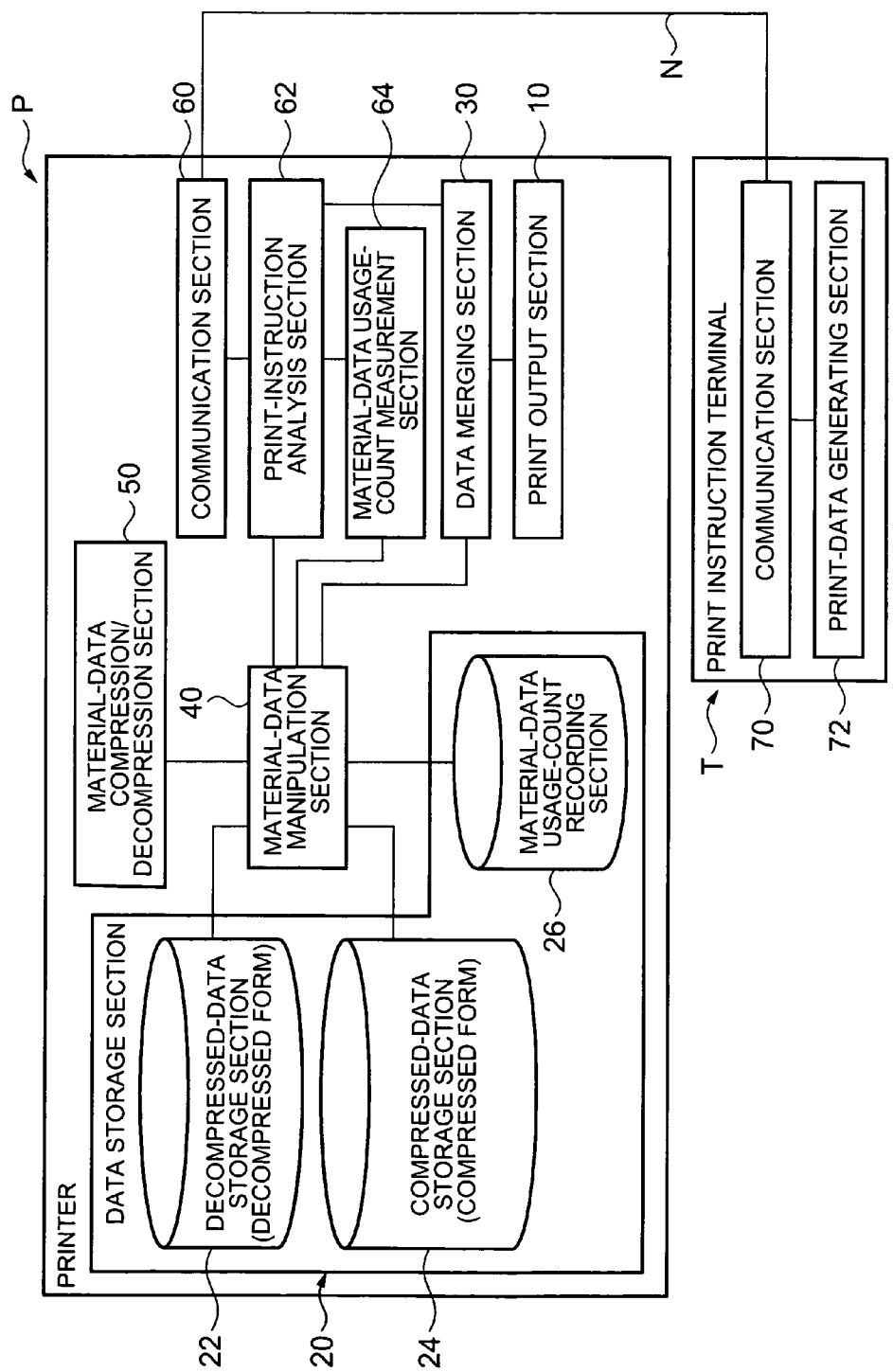
FIG. 1 is a block diagram of a printer and a print instruction terminal according to a first embodiment of the present invention.

FIG. 1 shows a printer P and a print instruction terminal T that form a printing system according to a first embodiment of the present invention.

The printer P that forms the printing system is a printer such as an inkjet printer or a laser printer, as shown in the drawing, which connects to the print instruction terminal T so as to allow information communication therewith via communication network N such as a LAN or a dedicated communication route (irrespective of whether wired or wireless). The printer P accommodates in its casing a print output section 10 which is negligible as a printing unit, a data storage section 20, a data merging section 30, a material-data manipulation section 40, and a material-data compression/decompression section 50.

The print output section 10 provides fundamental functions as a printing unit, such as a print function and a paper feed function, to practically print the print data produced in the data merging section 30, to be described later, onto specified printing paper to output an objective print.

The data storage section 20 provides the function of principally storing rendered material data such as image data. The data storage section 20 includes a decompressed-data storage section 22 and a compressed-data storage section 24.

The decompressed-data storage section 22 provides the function of storing only the rendered material data in a decompressed form, or in such a normal state that it can be used as print data without being processed. The compressed-data storage section 24 provides the function of principally storing the rendered material data in a compressed form, or only material data compressed to a compact size by the material-data compression/decompression section 50 etc., which will be described later.

Specifically, the data storage section 20 includes a hard disk drive (HDD), a semiconductor memory (flash storage), a DVD-ROM, and various rewritable nonvolatile storage units and storage media such as DVD-RW and CD-RW. As shown in the drawing, the data storage section 20 also serves as a material-data usage-count recording section 26 for recording data such as material-data usage count, which will be described later.

The data merging section 30 provides the function of producing print data (raster image data) necessary for printing by merging multiple material data stored in the data storage section 20 or the material data stored in the data storage section 20 and material data sent from the print instruction terminal T together with print instruction data in accordance with the instruction of the print instruction data. The data merging section 30 provides the function of rendering the material data sent from the print instruction terminal T together with the print instruction data, when the sent material data has not been rendered.

The material-data manipulation section 40 provides the function of manipulating the material data stored in the data storage section 20, such as call-up, storage, deletion, recording of usage count, compression, and decompression.

The material-data compression/decompression section 50 provides the function of compressing decompressed material data stored in the decompressed-data storage section 22 or decompressed material data sent from the print instruction terminal T into a compact size by using a specified compression algorithm according to the kind of material data and the function of decompressing compressed material data stored in the compressed-data storage section 24 or compressed material data sent from the print instruction terminal T into the original size.

As shown in FIG. 1, the printer P further includes a communication section 60, a print-instruction analysis section 62, and a material-data usage-count measurement section 64.

The communication section 60 provides an interface for communication with a communication section 70 provided to the print instruction terminal T to provide the function of transmitting/receiving various data such as print instruction data and material data to/from the print instruction terminal T in accordance with a specified communication protocol and procedure.

The print-instruction analysis section 62 provides the function of analyzing print instruction data from the print instruction terminal T and, specifically, it provides the function of analyzing information necessary for practically executing printing with the printer P such as material data ID that specifies the kind of the various material data used in printing, layout information indicative of the layout of the material data, and print-setting information and sending it to the material-data manipulation section 40 and the data merging section 30.

The material-data usage-count measurement section 64 provides the function of measuring the usage count of each material data stored in the data storage section 20, specifically, the usage count of material data used for producing the print data by the data merging section 30, and recording the measurement in the material-data usage-count recording section 26 of the data storage section 20. The material-data usage-count recording section 26 may be constructed of part of a storage area of the data storage section 20 or, alternatively, may be constructed of a separate storage unit.

It is also possible to achieve the functions of the print output section 10, the data storage section 20, the data merging section 30, the material-data manipulation section 40, the material-data compression/decompression section 50, the communication section 60, the print-instruction analysis section 62, and the material-data usage-count measurement section 64 of the printer P according to the invention by hardware with respective dedicated devices or, alternatively, to achieve them with software in a computer system which is now provided to most printers. Achieving the functions with software will provide easier and cost effective functions.

Figure 2:
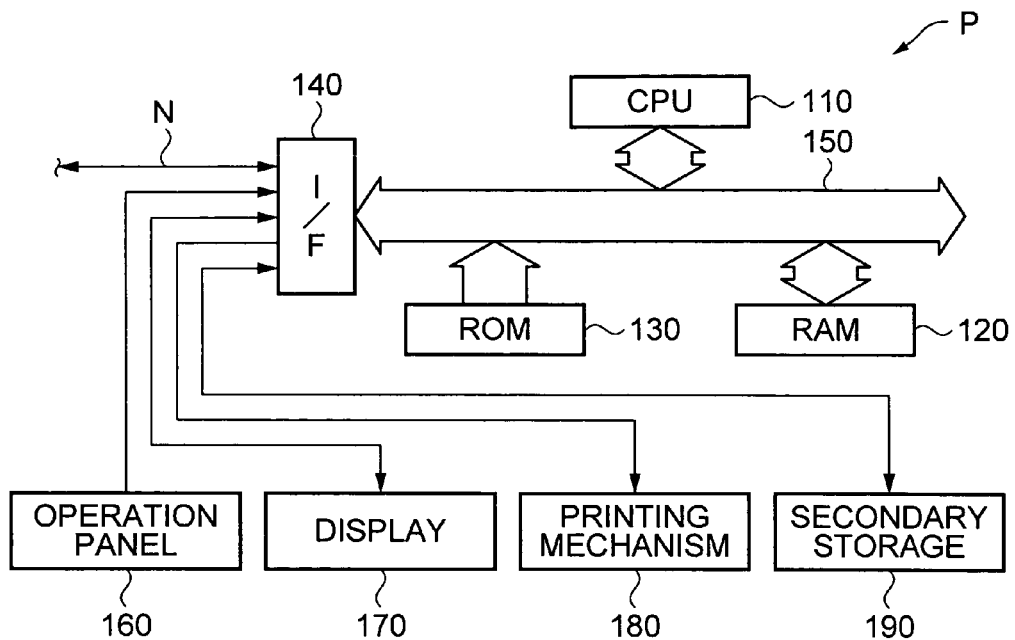
FIG. 2 is a block diagram of the hardware configuration of the printer according to the invention.

Referring to FIG. 2, the hardware for achieving the printer P is configured as follows. A central processing unit (CPU) 110 for performing various controls and operations, a random access memory (RAM) 120 serving as a main storage, and a read only memory (ROM) 130 are connected with various internal and external buses 150 such as a peripheral component interconnect (PCI) bus and an industrial standard architecture (ISA) bus; and a secondary storage 190 such as a hard disk drive (HDD) or a semiconductor memory, a display 170 formed of a display panel etc., an operation panel 160 which is one of input devices, a printing mechanism 180, and communication network N such as a LAN are connected to the buses 150 via an input/output interface (I/F) 140.

Upon turning on the power, a program for a printer system, such as a basic input/output system (BIOS), stored in the ROM 130 etc. loads various dedicated computer programs installed in the secondary storage 190 through storage media, such as CD-ROM, a DVD-ROM, a flexible disk (FD) or via a communication network such as the Internet, or various dedicated computer programs stored in the ROM 130 in advance, onto the RAM 120. The CPU 110 then performs specified controls and operations by using the various resources in accordance with instructions described in the programs loaded on the RAM 120, thereby achieving the above-described functions.

The print instruction terminal T connected to the printer P so as to communicate therewith is a general-purpose personal computer (PC) etc. operated by a user directly or indirectly. The print instruction terminal T includes the communication section 70 for transmitting print instruction data and material data to the printer P, a print-data generating section 72 for generating print data necessary for printing and including applications for editing and manipulating documents such as a word processor and an editor and environments (OS etc.) for operating them.

The functions of the communication section 70, the print-data generating section 72, etc. that form the print instruction terminal T can be achieved by hardware with respective dedicated devices or, alternatively, may be achieved with software in a general-purpose computer system such as a personal computer that includes all the functions of input, control, operation, storage, and output. Such a method will provide easier and cost effective functions.

Figure 3:
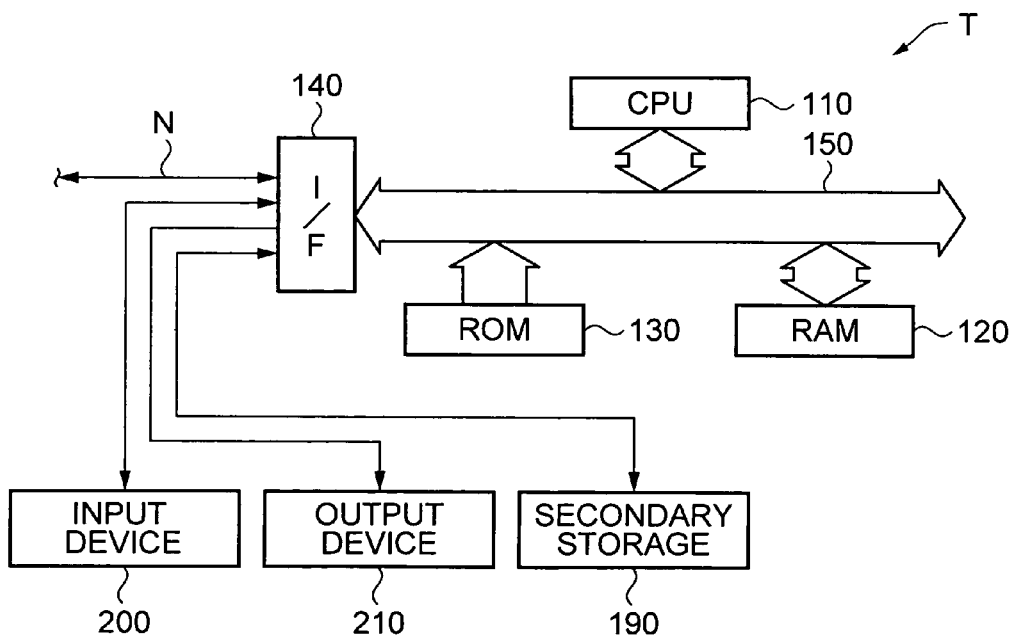
FIG. 3 is a block diagram of the hardware configuration of the print instruction terminal according to the invention.

Referring to FIG. 3, the hardware for achieving the print instruction terminal T is configured as follows. The CPU 110 for performing various controls and operations, the RAM 120 serving as a main storage, and the ROM 130 are connected with the buses 150; and the secondary storage 190 such as an HDD or a semiconductor memory, an output device 210 such as a liquid crystal display or a CRT display, input devices 200 such as a mouse, a keyboard, and an image scanner, and the LAN communication network N are connected to the buses 150 via the input/output interface (I/F) 140.

Upon turning on the power, a system program stored in the ROM 130 such as a BIOS loads various dedicated computer programs installed in the secondary storage 190 through storage media such as a CD-ROM, a DVD-ROM, and a flexible disk (FD) or via a communication network such as the Internet, or various dedicated computer programs stored in the ROM 130 in advance, onto the RAM 120. The CPU 110 then performs specified controls and operations by using the various resources in accordance with instructions described in the programs loaded on the RAM 120, thereby transmitting print instructions for generating print data and the print data to the printer P via the communication section 70.

Figure 4:
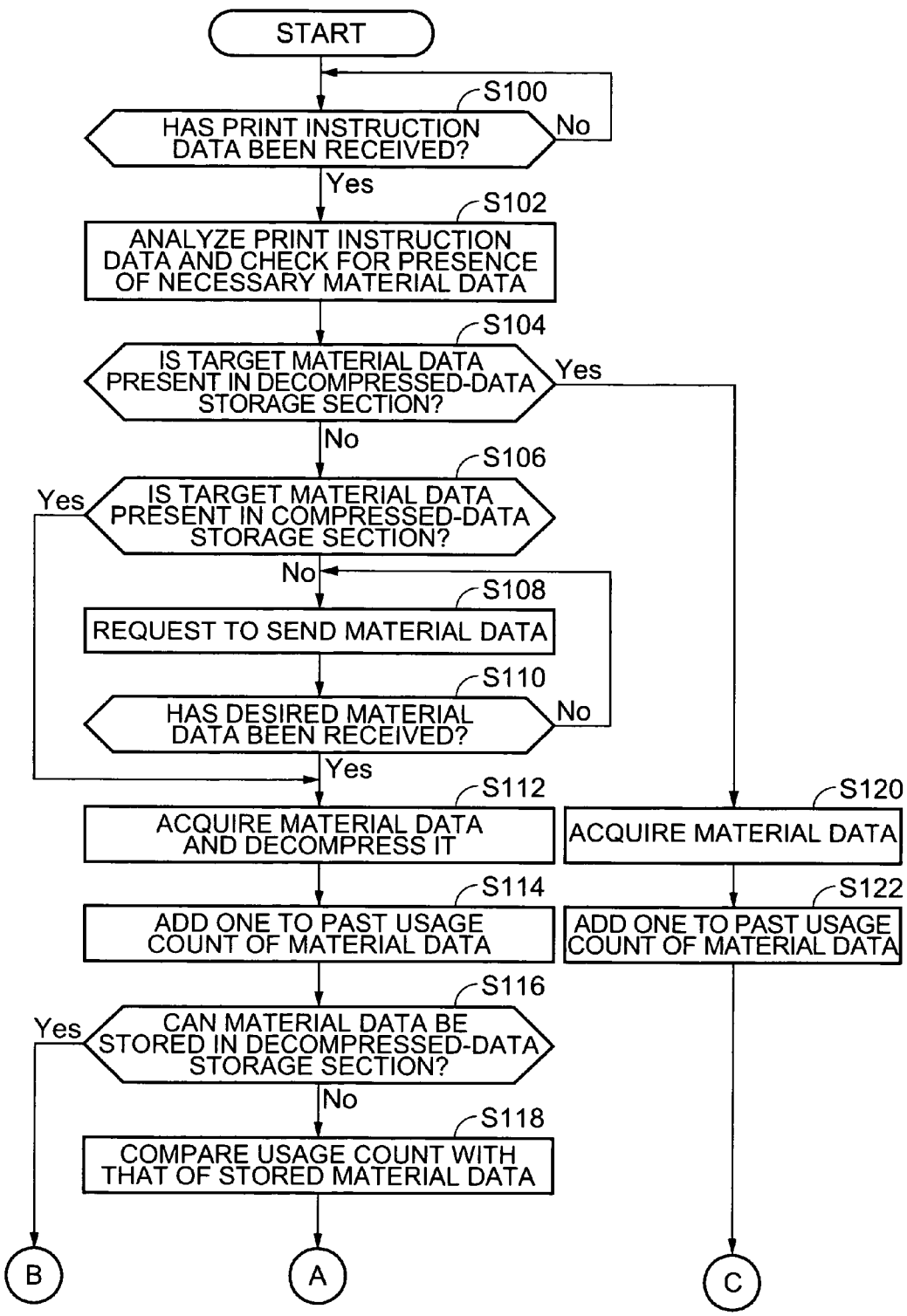
FIG. 4 is a flowchart for the first half of the process of the printer.
Figures 5, 6:
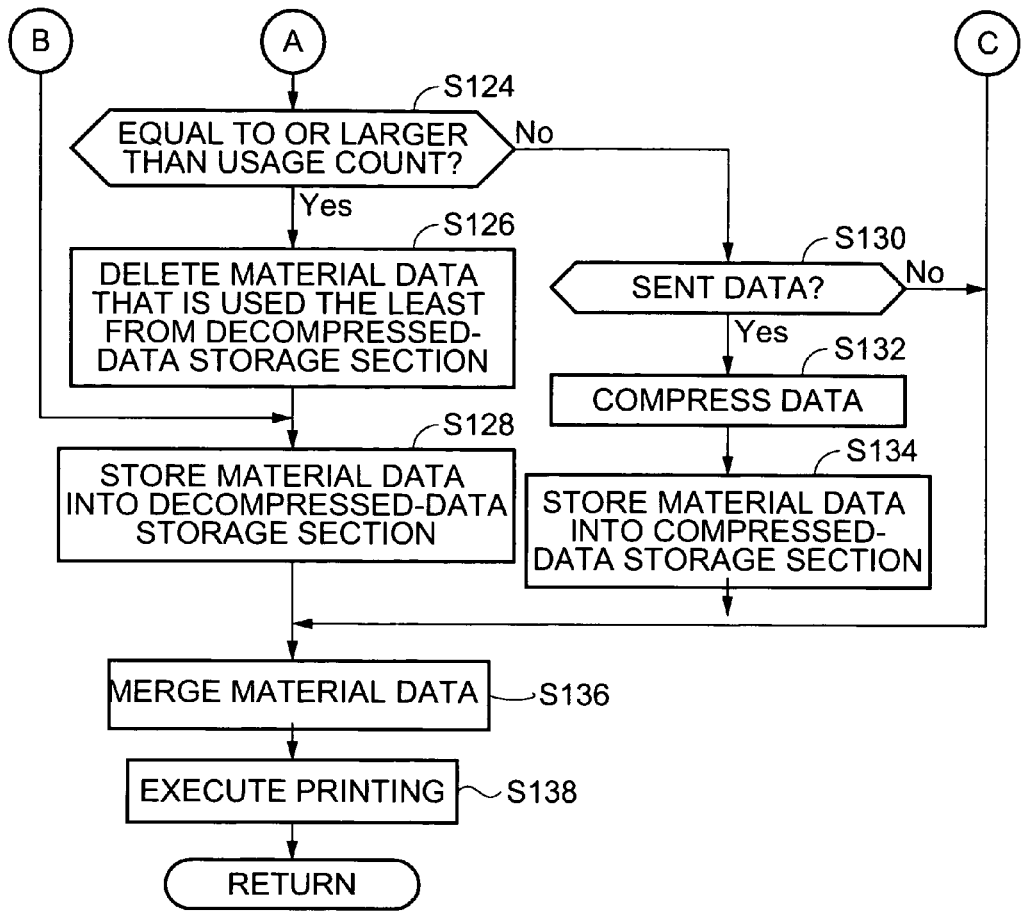
FIG. 5 is a flowchart for the latter half of the process of the printer.
FIG. 6 is a table of the relationship between material data and the frequency of use thereof.

Referring principally to the flowcharts of FIGS. 4 and 5, the flow of the process of the printer P with the above structure according to the invention and a printing method using the printer P will now be described. FIG. 4 shows the first half of the process of the printer P. FIG. 5 shows the latter half of the process.

As shown in the flowchart for the printer P of FIG. 4, upon turning on the power and completion of a specified setup, in the first step S100, the signal on the network N is monitored to determine whether or not character data of a document that designates the printer P itself and print instruction data have been received. When it is determined they have been received (Yes), the procedure moves to the following step S102, wherein the print-instruction analysis section 62 analyzes the print instruction data and the material-data manipulation section 40 determines whether or not material data (principally, image data) necessary for printing is present in the decompressed-data storage section 22 of the data storage section 20, and the procedure moves to the following step S104.

The print instruction data contains no material data itself necessary for printing, thus having very little information, limited to an identifier (ID) for identifying the material data and layout information for determining the size and arrangement thereof. Therefore, the transmission of the print instruction data does not increase network traffic or take a long time to transmit.

As a result of the determination, when it is determined in step S104 that the object material data is "present" (stored) in the decompressed-data storage section 22 (Yes), the procedure moves to step S120; when it is determined that the material data is "not present" (not stored) (No), the procedure further moves to the following step S106, wherein the material-data manipulation section 40 accesses the compressed-data storage section 24 of the data storage section 20 to determine whether or not the necessary material data is present in the compressed-data storage section 24.

As a result of the determination, it is determined to be "present" (Yes), the procedure jumps to step S112, while when it is determined to be "not present" (No), the procedure moves to the following step S108, wherein a request to send the material data is issued to the print instruction terminal T that has transmitted the print instruction data. Of course, the operation of determining whether or not necessary material data is present in the data storage section 20 is performed for each material data when the print instruction data contains multiple material data.

In the following step S110, when it is determined that desired material data has been received in response to the request (Yes), the procedure moves to the following step S112, wherein the material data is decompressed to the original size so as to be used for printing and then read out to the data merging section 30. In other words, when not only the material data acquired from the compressed-data storage section 24 but also the material data sent in response to a transmission request to the print instruction terminal T are transmitted in a compressed state, the material data cannot be used for printing without being processed, so they are temporality decompressed into the original size.

The procedure moves to the following step S114, wherein the material-data usage-count measurement section 64 adds "one" to the past usage count of the material data and the material-data usage-count recording section 26 records it.

For example, when the material data necessary for producing print data is material data read from the decompressed-data storage section 22 or the compressed-data storage section 24, the usage count becomes a value obtained by adding "one" to the past usage count; however, when it is material data newly acquired from the print instruction terminal T in response to transmission request, the usage count becomes "one."

FIG. 6 shows the data structure of examples of the relationship between "the name of material data" 500 for identifying the material data and their "frequency of use (usage count)." For example, the usage count of material data 501 referred to as "Data 000001" is 12, the usage count of material data 502 referred to as "Data 000021" is 321543, and the usage count of material data 50X referred to as "Data 999999" is 321. In step S114, "one" is added to the respective usage counts every time they are used. The added values are recorded in the material-data usage-count recording section 26.

Referring again to step S114 of FIG. 4, wherein when one is added to the past usage count of material data, the procedure moves to the following step S116, wherein the free storage of the decompressed-data storage section 22 is checked to determine whether or not the entire newly decompressed material data can be stored in the decompressed-data storage section 22.

As a result of the determination, when it is determined that the material data can be stored in the decompressed-data storage section 22 (Yes), the procedure jumps to step S128 of FIG. 5, where the decompressed material data is stored in the decompressed-data storage section 22. On the other hand, as shown in FIG. 4, when it is determined in step S116 that the material data cannot be stored, or the storage area is limited (No), the procedure moves to the following step S118, wherein material data that was used the least is selected from the material data stored in the decompressed-data storage section 22, whose usage count is compared with that of material data being stored.

As a result of the comparison, in the following step S124 shown in FIG. 5, when it is determined that the usage count of the target material data is equal to or larger than that of the comparative material data in the decompressed-data storage section 22 (Yes), the procedure moves to the following step S126. When the comparative material data is recorded also in the compressed-data storage section 24, it is deleted (erased) from the decompressed-data storage section 22. On the other hand, when the material data being deleted is not recorded in the compressed-data storage section 24, the copy of the material data is compressed and recorded in the compressed-data storage section 24 and then deleted from the decompressed-data storage section 22. This increases the free storage space of the decompressed-data storage section 22, allowing the material data being stored to be stored (recorded) in the decompressed-data storage section 22 (step S128).

When the material data being stored is acquired from the decompressed-data storage section 22, the comparing step S118 to step S128 can be omitted.

It is needless to say that the amount of material data being stored is significantly larger than that of one material data deleted from the decompressed-data storage section 22 so that it cannot be stored in the free space, material data that is next less used is also deleted.

When all the material data necessary for producing print data are prepared in this way, the procedure moves to step S136, wherein all the material data are merged in the data merging section 30 and then, in the following step S138, printing is executed to provide a print containing print data that is a combination of desired material data.

In step S124, when it is determined that the usage count of the material data being stored is less than the least use count of the comparative material data in the decompressed-data storage section 22 (No), the procedure moves to step S130, wherein it is then determined whether or not the material data being stored is the material data sent from the print instruction terminal T in response to the transmission request, or it is new material data that is not stored in the data storage section 20. When it is determined that the data is not new material data (No), the procedure jumps to step S136; when it is determined that the data is new material data (Yes), the procedure moves to the following step S132, wherein the copy is compressed. In the following step S134, the compressed material data is stored in the compressed-data storage section 24 and the original material data is used as part of the material data to be merged in step S136.

On the other hand, in step S104 of FIG. 4, when it is determined that necessary image data is present in the decompressed-data storage section 22, the procedure moves to step S120, wherein the copy of the material data is acquired from the decompressed-data storage section 22 and "one" is added to the usage count of the material data in step S122, as in step S114, and the data is used as part of the material data to be merged in step S136.

Figure 7A:
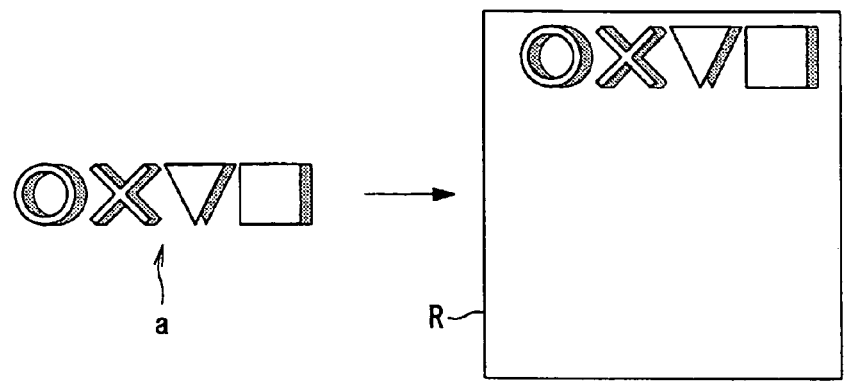
FIGS. 7(a) to 7(c) are schematic diagrams of the correspondence between material data and their layouts.
Figure 7B:
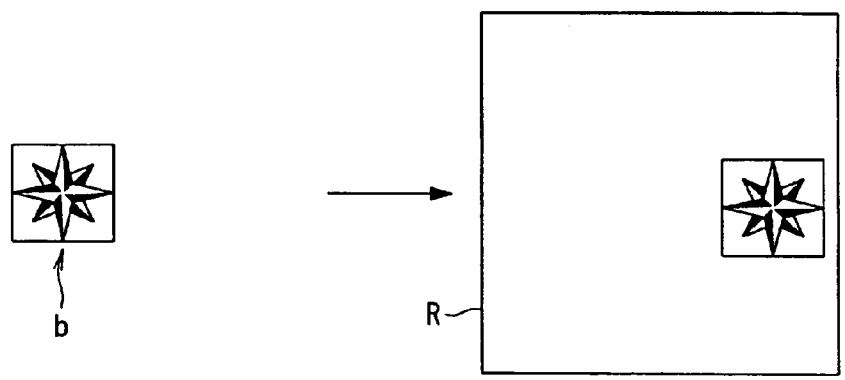
Figure 7C:
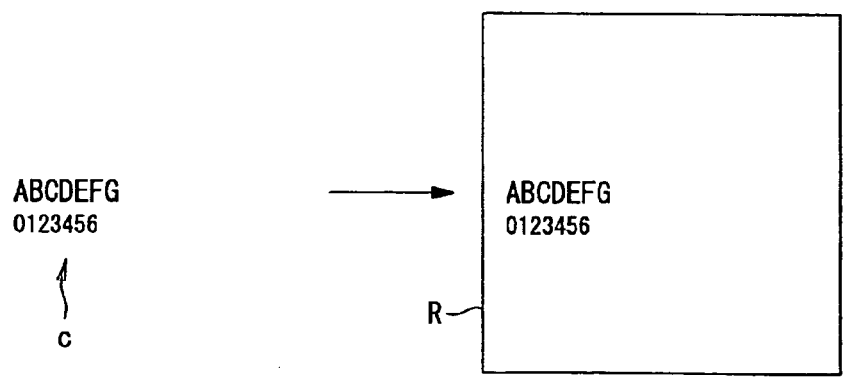
Figures 8, 9:
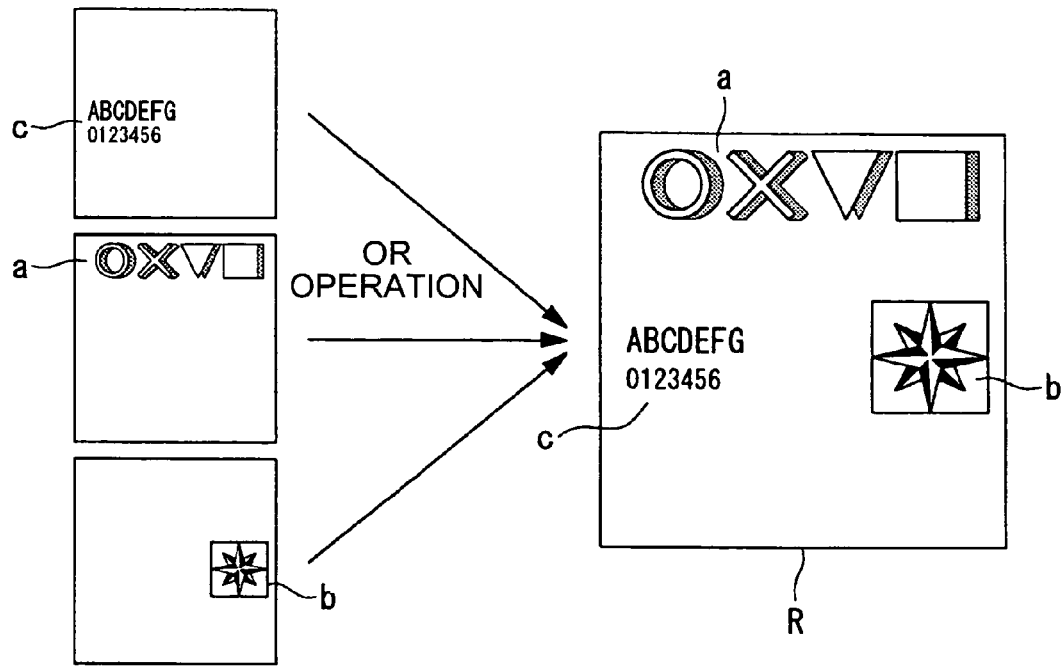
FIG. 8 is a schematic diagram of an image composed of laid-out material data.
FIG. 9 is a table of the relationship between material data and their kind- and position-instruction data.

FIGS. 7 to 9 show examples of the concept of print data, produced by laying out and merging the material data thus acquired.

When the material data (image data and character data) necessary for printing is acquired as described above, each material data is laid out in position in accordance with their respective position instruction data, as shown in FIG. 7.

With material data (image data) a on the left in FIG. 7(*a*), material-data-kind instruction data that is the identifier of a data content 301 is "Data 002512," and the position instruction data that is the layout information thereof is "(10, 10)," as shown on a layout table 300 of FIG. 9. The material data a is therefore laid out at the upper part of a layout region R with the position as reference, as shown on the right in FIG. 7(*a*).

With material data (image data) b on the left in FIG. 7(*b*), material-data-kind instruction data which is the identifier of a data content 302 is "Data 000021," and the position instruction data that is the layout information thereof is "(400, 250)," as shown in FIG. 9. The material data b is therefore laid out on the right-middle of the layout region R with the position as reference, as shown on the right in FIG. 7(*b*).

With material data (character (string) data) c on the left in FIG. 7(*c*), the material data of a data content 303 is text data "ABCDEFG ↓ 0123456," and the position instruction data is "(10, 250)," as shown in FIG. 9. The material data c is therefore laid out on the left-middle of the layout region R with the position as reference, as shown on the right in FIG. 7(*c*).

As shown in FIG. 8, when the three material data are merged by OR operation, one print data (raster image data) is obtained. The print output section 10 performs printing on the basis of the print data to obtain the print with the image shown on the right in the drawing.

According to the embodiment, when material data used for printing is rendered and stored in the printer P in a compressed form, some frequently used image data of the stored material data is stored in such a decompressed state that it can be used immediately. This saves or significantly reduces the time necessary for decompressing material data, resulting in a substantial decrease of the time to the first printing, allowing high speed printing.

This embodiment can offer remarkable advantages by using massive image data as material data to be stored in the printer P. It is however to be understood that the material data is not limited to the image data but may be character data etc. with relatively small amount of data.

Referring to FIGS. 10 to 22, the printer P according to a second embodiment of the invention and the print instruction terminal T according to the invention which works in connection to the printer P will be described.

Figure 10:
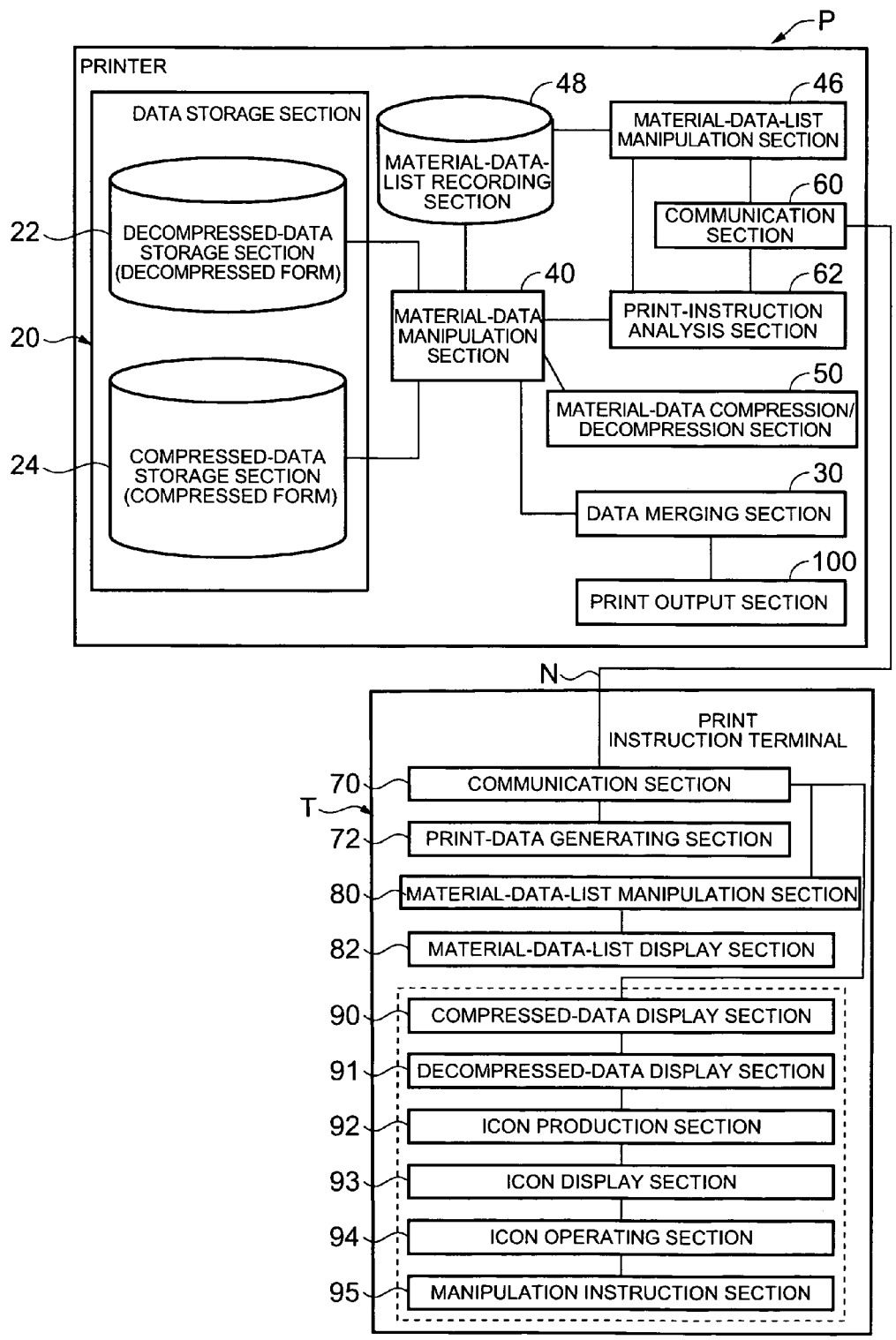
FIG. 10 is a block diagram of a printer and a print instruction terminal according to another embodiment of the present invention.

Referring first to FIG. 10, the printer P connects to the print instruction terminal T such as a PC so as to allow information communication therewith via the communication network N. The printer P accommodates in its casing the print output section 10 which is negligible as a printing unit, the data storage section 20 including the decompressed-data storage section 22 for storing rendered material data in a decompressed form and the compressed-data storage section 24 for storing rendered material data in a compressed form, the data merging section 30 for merging decompressed material data to produce print data, the material data manipulation section 40 for manipulating material data, the material-data compression/decompression section 50 for compressing or decompressing material data using a specified compression algorithm, the communication section 60 for communicating with the print instruction terminal T, and the print-instruction analysis section 62 for analyzing print instruction data sent from the print instruction terminal T, as in the first embodiment. The printer P further includes a material-data-list manipulation section 46 and a material-data-list recording section 48.

Among the above, the functions of the print output section 10, the data storage section 20 including the decompressed-data storage section 22 and the compressed-data storage section 24, the data merging section 30, the material-data manipulation section 40, the material-data compression/decompression section 50, the communication section 60, and the print-instruction analysis section 62 are the same as those of the first embodiment. Their description will therefore be omitted here. Of the new components, the material-data-list manipulation section 46 provides the function of editing the list of the material data in response to the instruction from the print instruction terminal T, in which the contents of the edited material-data list are recorded and stored in the material-data-list recording section 48.

The material-data-list recording section 48 is one type of data storage means for storing the contents of the edited material-data list and includes dedicated rewritable storage unit separated from the data storage section 20 etc. and part of the storage area of a storage unit such as a hard disk drive (HDD) or a semiconductor memory device.

The print instruction terminal T that is connected to the printer P so as to allow communication therewith is a general-purpose personal computer (PC) etc. operated by a user directly or indirectly, and includes, as in the foregoing embodiment, the communication section 70 that provides the function of transmitting information to the printer P, the print-data generating section 72 for generating print data necessary for printing, for example, applications for editing and manipulating documents such as a word processor and an editor, and OS etc., as in the first embodiment, and in addition, the print instruction terminal T further includes a material-data-list manipulation section 80 and a material-data-list display section 82.

The material-data-list display section 82 provides the function of acquiring information on material data stored in the data storage section 20 of the printer P and displaying the information as a material-data list as shown in FIG. 17 etc. The material-data-list manipulation section 80 provides the user with the function of manipulating the material data displayed on the material-data list with an input device (a mouse, a keyboard, etc.) of the print instruction terminal T.

While the functions of the printer P according to the embodiment can be achieved by hardware with respective dedicated devices as in the printer P of the first embodiment, it can also be achieved with software by using a computer system which is now provided to most printers and which includes the CPU 110, the RAM 120, the ROM 130, the buses 150, the input/output interface 140, the operation panel 160, the display 170, the printing mechanism 180, and the secondary storage 190. This allows the functions to be achieved easily and economically.

The print instruction terminal T can also be achieved by hardware with dedicated devices, as in the first embodiment. As shown in FIG. 3, it can also be achieved with software by using a general computer system such as a personal computer that has all the functions of input, control, operation, storage, and output. This allows the functions to be achieved easily and economically.

Referring to the flowcharts of FIGS. 11 to 13, the flow of the process of the printer P and the print instruction terminal T with the above structure according to the invention will now be described.

Figure 11:
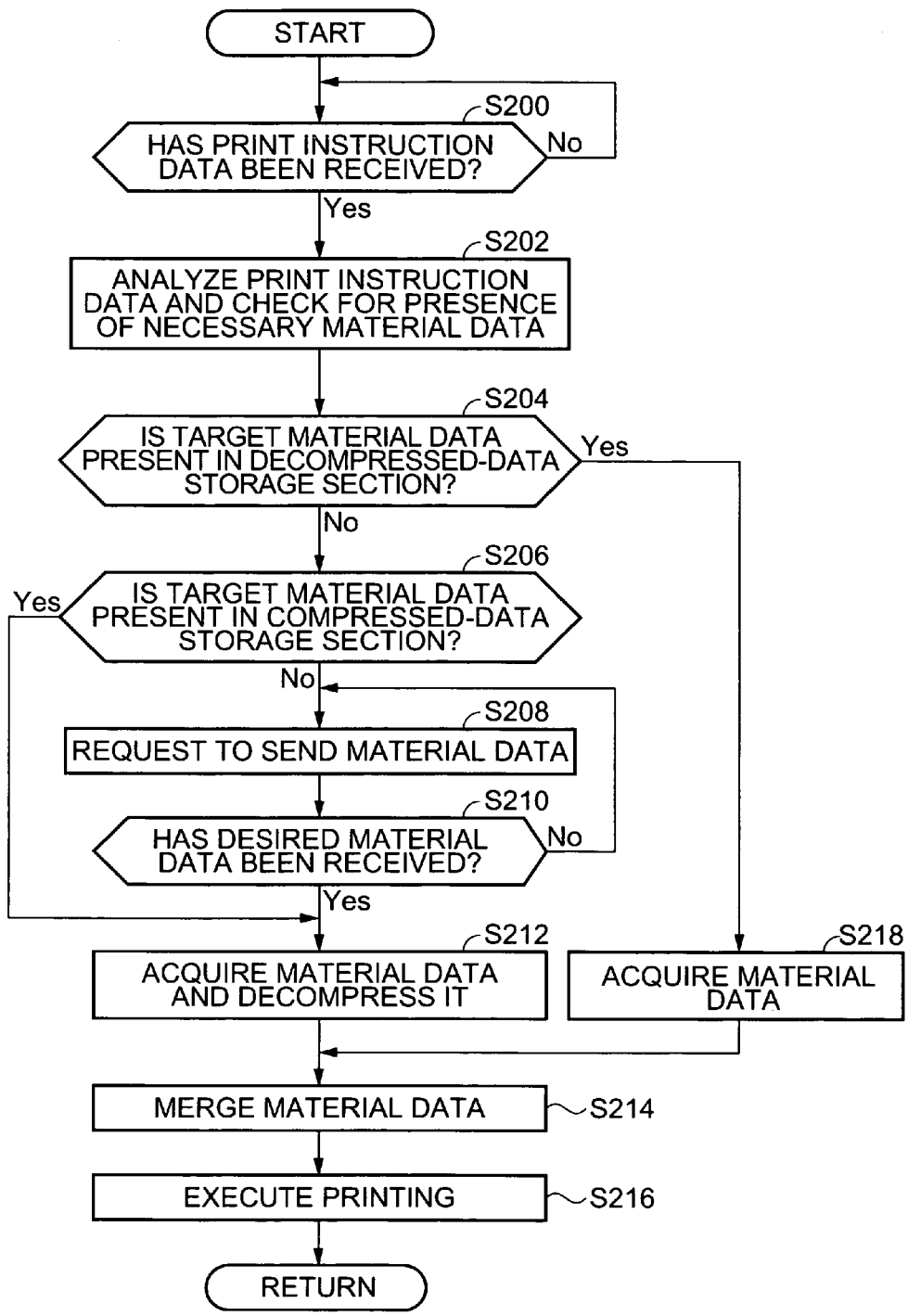
FIG. 11 is a flowchart for the process from print instruction to print execution.

FIG. 11 shows the flow of the process from print instruction to print execution by the user. FIG. 12 shows the flow of storage of material data when new material data is present in the printing process. FIG. 13 shows an example of the flow of manipulation of material data according to the instruction from the print instruction terminal T.

As shown in the flowchart for the printer P of FIG. 11, upon turning on the power and completion of a specified setup, in the first step S200, the signal on the network N is monitored to determine whether or not character data of a document that designates the printer P itself and print instruction data have been received.

When it is determined they have been received (Yes), the procedure moves to the following step S202, wherein the print-instruction analysis section 62 analyzes the print instruction data and the material-data manipulation section 40 determines whether or not material data necessary for producing its print data is present in the decompressed-data storage section 22 of the data storage section 20. As in the first embodiment, the print instruction data contains no material data itself necessary for the printing but contains only very limited information such as an identifier (ID) for identifying the material data, and layout information for determining the size and arrangement, etc. There are therefore no problems of increasing network traffic and taking a long time for transmitting the print instruction data.

The procedure moves to the following step S204, wherein when it is determined that the object material data is "present" in the decompressed-data storage section 22 (Yes), the procedure moves to step S218, wherein the material data is acquired and, the procedure jumps to step S214; on the other hand, when it is determined that the material data is "not present" (No), the procedure further moves to the following step S206, wherein the material-data manipulation section 40 accesses the compressed-data storage section 24 to determine whether or not the target material data is present in the compressed-data storage section 24.

As a result of the determination, when it is determined to be "present" (Yes), the procedure jumps to step S212; while when it is determined to be "not present" (No), the procedure moves to the following step S208, wherein a request to send the material data is issued to the print instruction terminal T that has transmitted the print instruction data. As in the first embodiment, the operation of determining whether or not necessary material data is present is performed for each material data when the print instruction data contains multiple material data.

In the following step S210, when it is determined that desired material data has been sent in response to the request (Yes), the procedure moves to the following step S212, wherein the material data is decompressed to the original size by the material-data compression/decompression section 50 so as to be used for printing and then read out to the data merging section 30. In other words, as in the first embodiment, when not only the material data acquired from the compressed-data storage section 24 but also the material data sent in response to a transmission request are transmitted in a compressed state, the material data cannot be used for printing without being processed, so they must be temporality decompressed to the original size.

The procedure then moves to the following step S214, the data merging section 30 of the printer P merges the material data thus acquired to form one print data (raster image data) and sends it to the print output section 10. In step S216, the print output section 10 executes a printing process using the print data, thereby providing a print of the desired material data.

Accordingly, since there is no need to send stored massive material data to the printer P every printing process, the amount of data to be transferred is significantly reduced to advance the printing start time. Also, image data to be used in printing is stored in such a state that part of the image data stored in a decompressed state to be used immediately. This reduces the time necessary for decompressing the material data, resulting in a reduction of the delay for the first print-out.

Since all the stored data are rendered, the need for the time and load necessary for rendering is eliminated.

FIGS. 14 to 16 show examples of the concepts of print data, which are produced by laying out and merging the material data.

When the material data necessary for printing is acquired as described above, each material data is laid out in position in accordance with their respective position instruction data, as shown in FIG. 14.

Figure 14A:
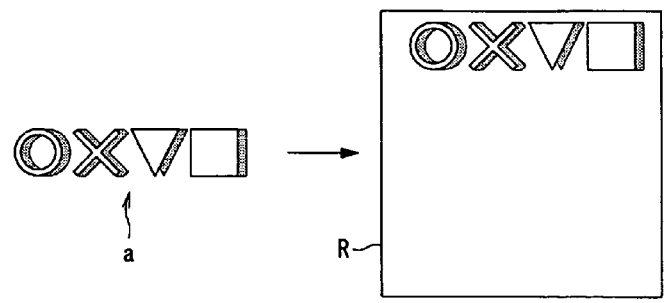
FIGS. 14(a) to 14(d) are schematic diagrams of the correspondence between material data and their layouts.

With material data a on the left in FIG. 14(a), material-data-kind instruction data that is the identifier of the data content 301 is "Data 002512," and the position instruction data that is the layout information thereof is "(10, 10)," as shown on the layout table 300 of FIG. 16. The material data a is therefore laid out at the upper part of the layout region R with the position as reference, as shown on the right in FIG. 14(a).

Figure 14B:
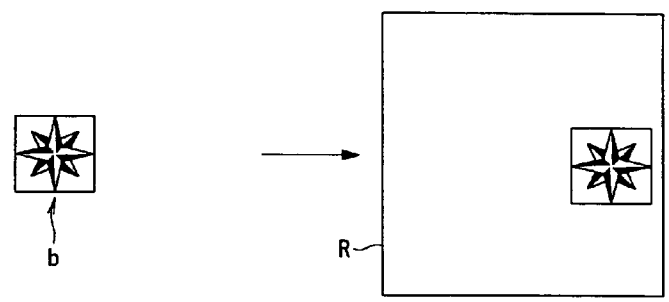

With material data b on the left in FIG. 14(b), material-data-kind instruction data that is the identifier of the data content 302 is "Data 000021," and the position instruction data that is the layout information thereof is "(400, 250)," as shown in FIG. 16. The material data b is therefore laid out on the right-middle of the layout region R with the position as reference, as shown on the right in FIG. 14(b).

Figure 14C:
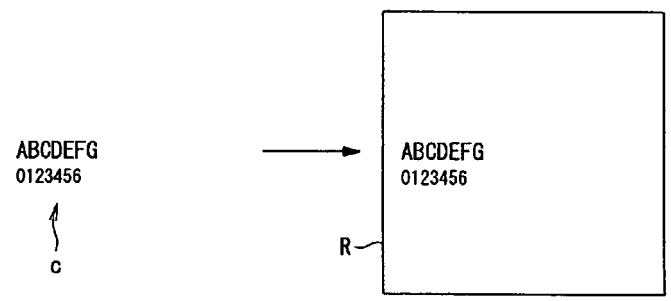

With material data (character string data) c on the left in FIG. 14(c), the character string data of the data content 303 is text data "ABCDEFG ↓ 0123456," and the position instruction data is "(10, 250)," as shown in FIG. 16. The material data c is therefore laid out on the left-middle of the layout region R with the position as reference, as shown on the right in FIG. 14(c).

Figure 14D:
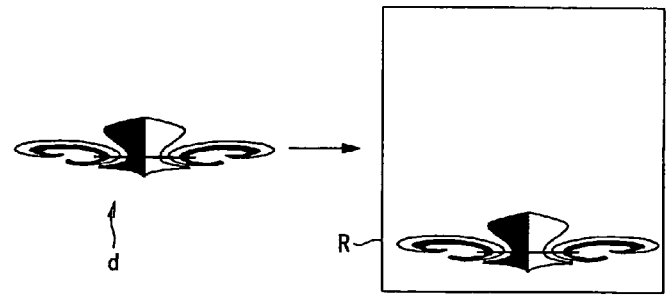

With material data (image data) d on the left in FIG. 14(d), according to the description of the material data and its position instruction data "(10, 600)," as shown in a data content 304 of FIG. 16, the material data d is laid out at the lower part of the layout region R with the position as reference, as shown on the right in FIG. 14(d). Since the material data d is also described as "REGISTER_COMPRESS" as "registration instruction for new material data," the material data d is recorded (registered) in a compressed form in the compressed-data storage section 24 after printing process.

As shown in FIG. 15, the four data are merged by OR operation of these layouts to produce one print data (raster image data). They are printed to provide a print with the image shown on the right in the drawing.

Figure 12:
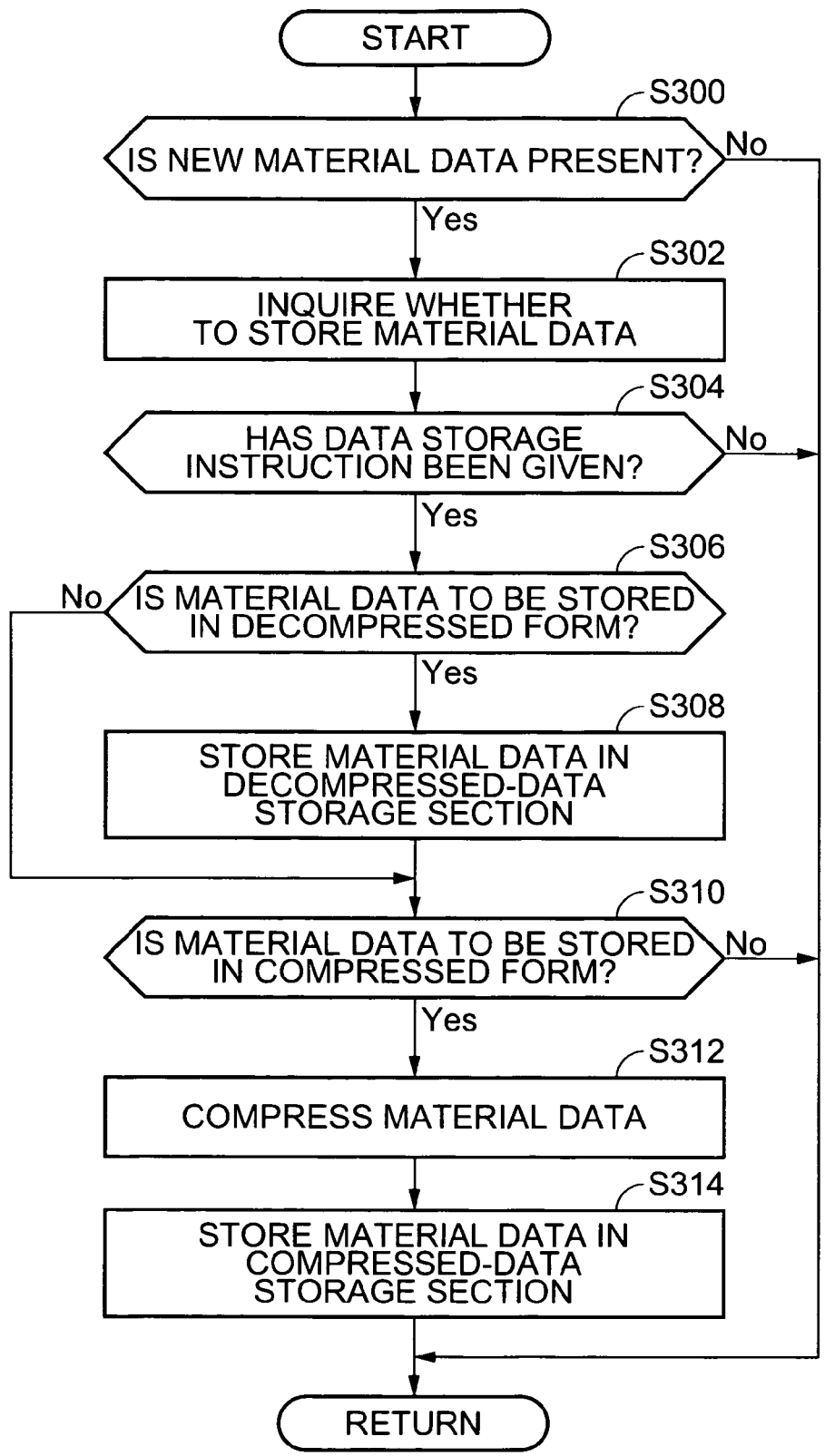
FIG. 12 is a flowchart for the process when new material data is present.

Upon completion of the printing process according to the print instruction as described above, the printer P shifts its operation to the material data storing process as shown in the flowchart of FIG. 12.

In the material-data storing process, in the first step S300, it is determined whether or not new material data that is not stored in the printer P of the material data used in the printing process, that is, material data sent in response to the request of step S208 in FIG. 11 is present, wherein when it is determined to be "not present" (No), it is determined that all the material data used in the printing process are stored in the data storage section 20 of the printer P and the procedure is completed. On the other hand, when it is determined to be "present" (Yes), the procedure moves to the following step S302, wherein an inquiry on whether or not to store the material data in the data storage section 20 of the printer P is issued to the print instruction terminal T.

In the following step S304, when an instruction not to store the material data (No) is given from the print instruction terminal T in response to the inquiry, the procedure is completed; when an instruction to store the material data is given (Yes), the procedure moves to the following step S306, wherein it is determined whether or not to store it in a decompressed form. When it is stored in a decompressed form (Yes), the procedure moves to step S308, wherein a material-data register section 13 (not shown) of the material-data manipulation section 40 stores the image data in the decompressed-data storage section 22. On the contrary, when it is not stored in the decompressed form (Yes), the procedure jumps to step S310.

When there is no response for a specified time to the inquiry of step S302, the storing process may be completed by timing out, as in step S300 in which no new material data is present.

In step S310, it is determined whether or not to store the material data in a compressed form and when it is not stored in the compressed form (No), the process is completed. On the other hand, it is stored in a compressed form (Yes), the procedure moves to the following step S312, wherein the material data is compressed using a specified compression algorithm by the material-data compression/decompression section 50. After the compression of data, the procedure moves to step S314, wherein the compressed material data is stored in the compressed-data storage section 24 and the procedure for the storage of new material data is completed.

Thus, not only the storage of new material data but also its storage form can be properly determined according to the instruction from the print instruction terminal T (a user etc.).

Accordingly, even in the case in which material data is stored in the printer P according to the frequency of past use, the material data can be properly processed such that it is stored in the decompressed-data storage section 22 with priority when the material data is to be frequently used hereafter and when the material data is not suitable for repeated compression as in the JPEG system.

Since the printer P according to the embodiment includes the material-data-list manipulation section 46 and the material-data-list recording section 48, the requirements for the manipulation of stored data such as the change of material-data storage form and deletion of material data can be met in response to the request from the user.

Figure 13:
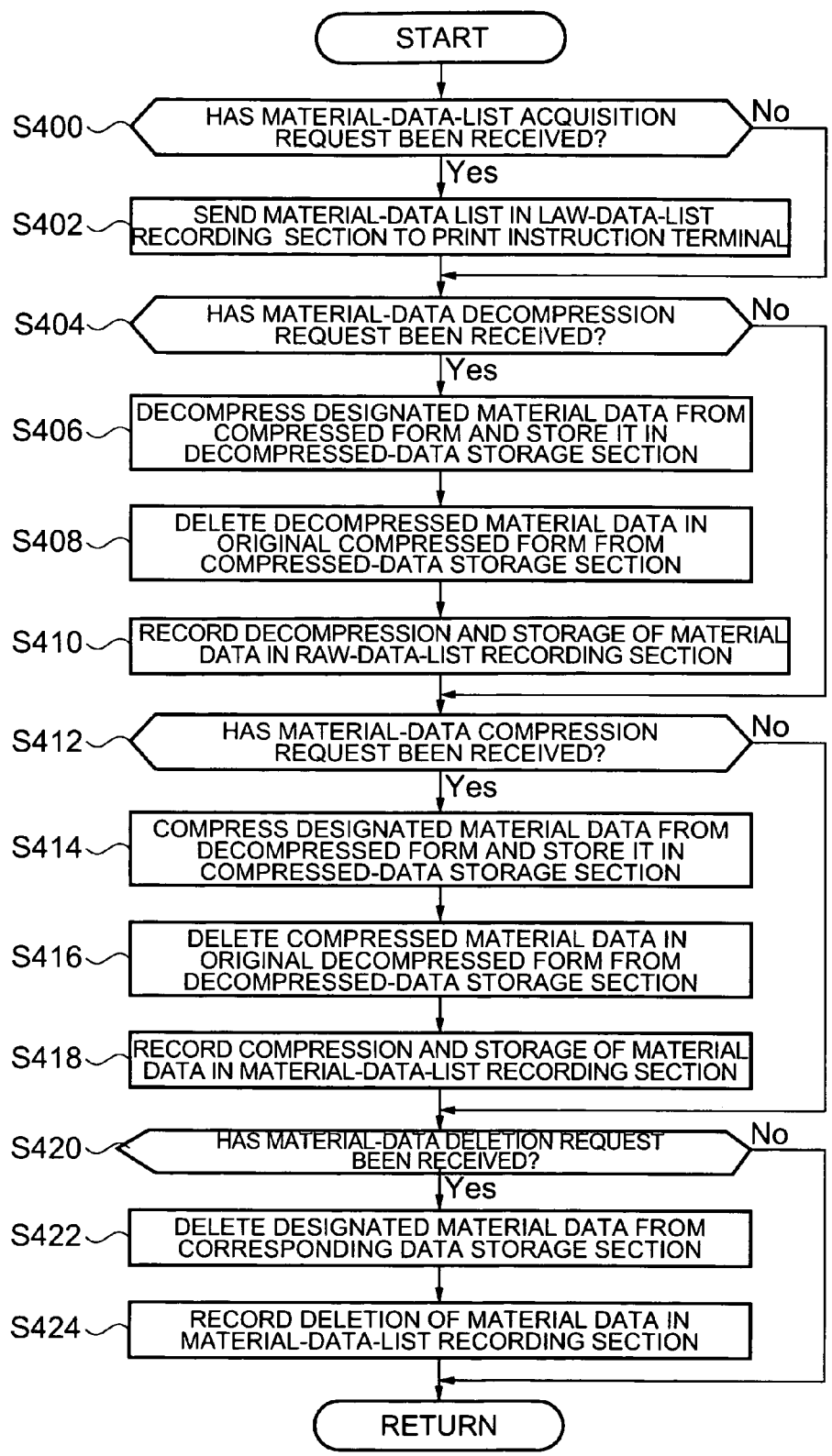
FIG. 13 is a flowchart for the manipulation of material data by a user.

Specifically, as shown in the first step S400 of FIG. 13, the printer P monitors the acquisition request for the material-data list stored in the material-data-list recording section 48 from the print instruction terminal T. When it is determined that the request has been received (Yes), the procedure moves to the following step S402, wherein the material-data list is sent to the print instruction terminal T.

The form of the material-data list is not particularly limited. For example, a material-data list 100 of FIG. 17 shows "the name of material data" 110, "the size of material data" 120, "the form of data" 130, i.e. discrimination on whether a compressed form or a decompressed form and, when it is in a compressed form, "decompressed data size" 140, etc. In the example of FIG. 17, material data 101 having a material data name "Data 002512" and a data size of "83,955 bytes" is in a compressed form (COMPRESS), and after decompression, it becomes "656,846 bytes" in data size; material data 102 having a material data name "Data 000021" and a data size of "14,182 bytes" is in a compressed form (COMPRESS), and after decompression, it becomes "2,166,838 bytes" in data size; and material data 103 having material data name "Data 001232" and a data size of "17,125 bytes" is in a decompressed form (DECOMPRESS), and does not need the following decompression.

As shown in step S404 of FIG. 13, the printer P is in a mode of waiting for an instruction from the print instruction terminal T not only after the transmission of the material-data list but also when no material-data list is transmitted ("No" in step S400). In step S404, when a material-data decompression request has been received (Yes), the procedure moves to the following step S406, wherein designated material data is read from the compressed-data storage section 24, decompressed and stored in the decompressed-data storage section 22. The procedure moves to the following step S408, wherein the original material data in a compressed form is deleted from the compressed-data storage section 24 after the decompression. The procedure moves to the following step S410, wherein the decompression and storage of the material data in step S406 are recorded in the material-data-list recording section 48.

Specifically, the print instruction terminal T which requested the material-data list in step S400 grasps the storage form of any material data by using the material-data-list display section 82 and the material-data-list manipulation section 80 of the print instruction terminal T and, a request to store the material data in a decompressed form is satisfied. This allows appropriate manipulation and management of material data as a user intended.

In step S412, when the printer P has received a request to compress material data (Yes), the procedure moves to the following step S414, where the designated material data is read from the decompressed-data storage section 22 and stored in a compressed form in the compressed-data storage section 24. In the following step S416, the original material data in a decompressed form after compression is deleted from the decompressed-data storage section 22. The procedure moves to the following step S418, wherein the compression and storage of the material data in step S414 are recorded in the material-data-list recording section 48.

In step S420, when the printer P has received a request to delete material data (Yes), the procedure moves to the following step S422, where the designated material data is deleted from the corresponding data storage section 22 or 24. The procedure moves to the following step S424, wherein the deletion is recorded in the material-data-list recording section 48.

Consequently, for example, only material data that is determined to be unnecessary by a user who saw the material-data list on the print instruction terminal T can be deleted from the data storage section 22 or 24. This appropriately avoids the waste of storage space of the data storage section 20 because of the presence of unnecessary material data and redundantly stored material data.

FIG. 18 is a manipulation instruction table 200 of examples of instructions for material data based on the material-data list, in which "the kind of instruction" 210 and transmission data 220 are specified. For example, an instruction kind 201 specifies material-data name "Data 001232" and its instruction "DECOMPRESS" and an instruction kind 203 specifies material-data name "Data 001232" and its instruction "DELETE."

Referring now to FIG. 10 and FIGS. 19 to 21, the print instruction terminal T according to another embodiment of the invention will be described.

The print instruction terminal T according to the embodiment includes a compressed-data display section 90, a decompressed-data display section 91, an icon production section 92, an icon display section 93, an icon operating section 94, and a manipulation instruction section 95, surrounded by the broken line in FIG. 10, in place of the material-data-list manipulation section 80 and the material-data-list display section 82 of the print instruction terminal T in FIG. 10.

The compressed-data display section 90 and the decompressed-data display section 91 correspond to the compressed-data storage section 24 and the decompressed-data storage section 22 of the data storage section 20 of the printer P, respectively, and provide the function of providing areas for displaying small images or small illustrations corresponding to the material data stored in the data storage sections 22 and 24, such as icons and thumbnails (hereinafter, referred to as icons I), on the monitor (display section) of the print instruction terminal T. For example, as shown in FIG. 19, the compressed-data display section (COMPRESS) 90 is displayed on the right of a monitor M of the print instruction terminal T and the decompressed-data display section (READY (DECOMPRESS)) 91 is displayed on the left of the monitor M of the print instruction terminal T.

The icon production section 92 provides the function of producing icons I that correspond to material data stored in the decompressed-data storage section 22 or the compressed-data storage section 24. The icon display section 93 provides the function of displaying the icons I produced by the icon production section 92 in the compressed-data display section 90 or the decompressed-data display section 91 depending on the position where the corresponding material data is stored.

Figure 19:
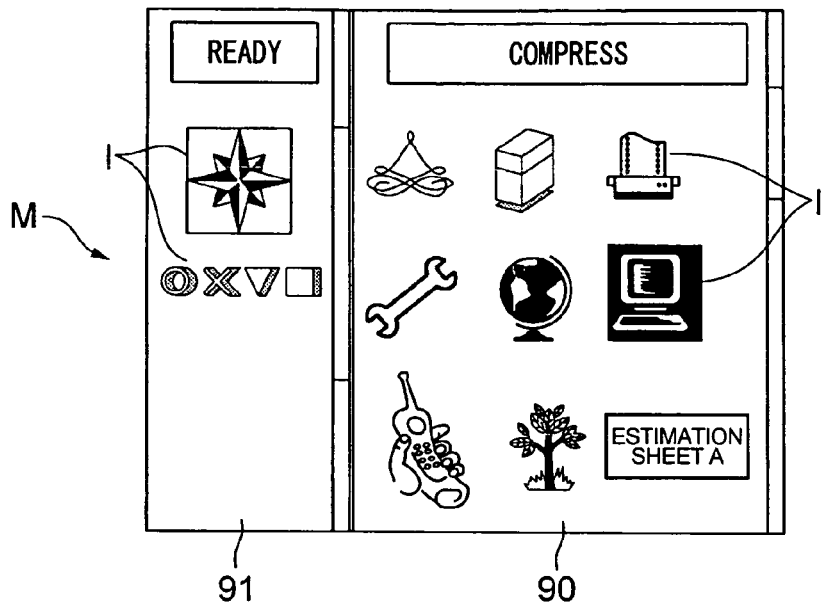
FIG. 19 is a diagram of an example of a material-data list displayed on a screen.

In the example of FIG. 19, the icon production section 92 produces icons I corresponding to material data on an image that represents "a cellular phone" and an image that represents "a spanner." The icons I are displayed on the compressed-data display section 90 by the icon display section 93 since the material data that correspond to the icons I are stored in the compressed-data storage section 24.

Figure 20:
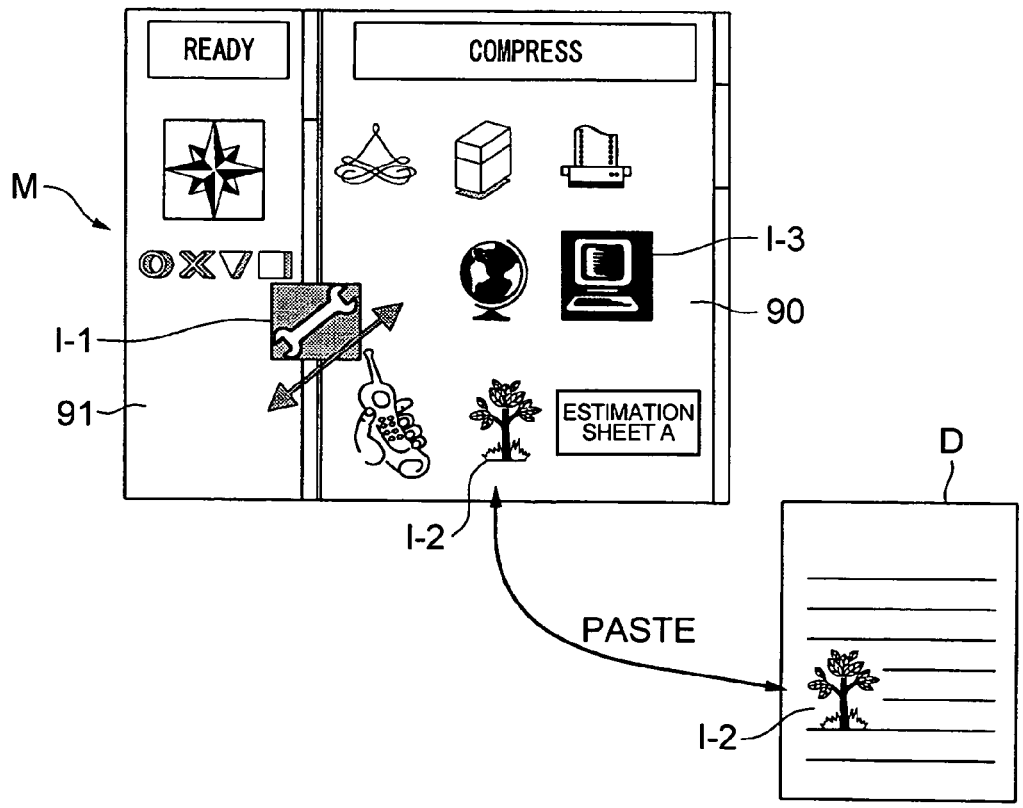
FIG. 20 is a diagram of an example of data manipulation using the material data-list display screen.

Referring to FIG. 20, the icon operating section 94 provides the function of moving the icons I between the compressed-data display section 90 and the decompressed-data display section 91, such as an icon I-1 of a spanner shown, registering new icons I like an icon I-2 of a tree, and deleting the displayed icons I, such as an icon I-3 of a PC.

The manipulation instruction section 95 provides the function of instructing the material-data manipulation section 40 of the printer P of the manipulation of material data that corresponds to the icons I in synchronization with the operation of the icons I by the icon operating section 94.

Since the print instruction terminal T according to the embodiment includes the compressed-data display section 90, the decompressed-data display section 91, the icon production section 92, the icon display section 93, the icon operating section 94, and the manipulation instruction section 95, the user who operates the print instruction terminal T can not only easily grasp what material data is stored in what storage form in the data storage section 20 of the printer P but also easily operate the material data stored in the data storage section 20 of the printer P with input devices of the print instruction terminal T such as a mouse and a keyboard, merely by viewing the icons I displayed on the monitor M.

In other words, in the example of FIG. 19, the decompressed-data display section 91 stores two material data in a decompressed form; while the compressed-data display section 90 stores nine material data in a compressed form.

Accordingly, as shown in FIG. 20, when the user moves the icon I-1 that represents "a spanner" via drag-and-drop from the decompressed-data display section 91 to the compressed-data display section 90 by using an input device such as a mouse, the printer P that has received the operating instruction decompresses material data that corresponds to the icon I-1 of "a spanner" stored in the compressed-data storage section 24, moves it to the decompressed-data storage section 22, and stores it therein, in synchronization with the operation.

In order to delete the icon I-3 that represents "a personal computer," selecting it and then pushing a DELETE key cause the printer P that has received the operation instruction to delete the material data that corresponds to the icon I-3 of a personal computer from the compressed-data storage section 24.

In order to use the icon I-2 that represents a tree for documentation, when it is dragged and dropped to the corresponding field of a document D with a mouse, an application for the documentation can recognize it and take it into the document D for use. In order to store the material data used in the document D in the data storage section 20 of the printer P, when the material data is dragged and dropped into any of the display sections 90 and 91 with a mouse, the icon I-2 that corresponds to the material data is produced and displayed in the display section 90 or 91 and the material data is actually sent to the printer P, so that the printer P can store the material data in the data storage section 20.

Figure 21A:
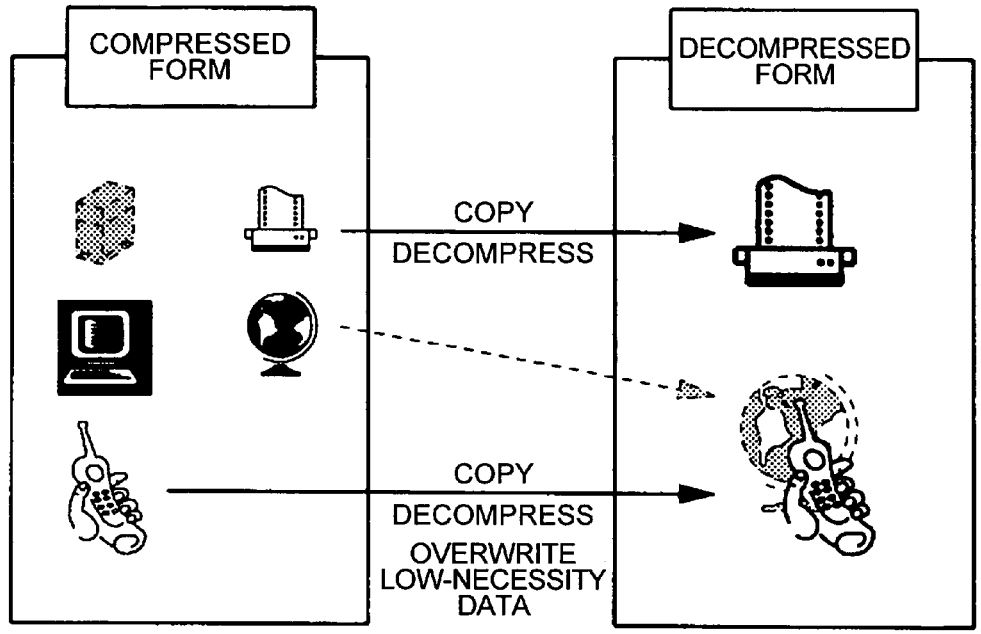
FIGS. 21(a) and 21(b) are schematic diagrams of examples of a material-data storage form.

Although the embodiment is constructed such that material data is stored in either decompressed-data storage section 22 or the compressed-data storage section 24, all material data may be stored in the decompressed-data storage section 22, the copy (reproduction) of part of which may be stored in the compressed-data storage section 24, as shown in FIG. 21(a).

With such a structure, unnecessary material data can be deleted or overwritten when the storage space of the decompressed-data storage section 22 becomes full. This allows omission of the process of recompressing material data and returning it to the compressed-data storage section 24, thus reducing a process load on the printer P.

Figure 21B:
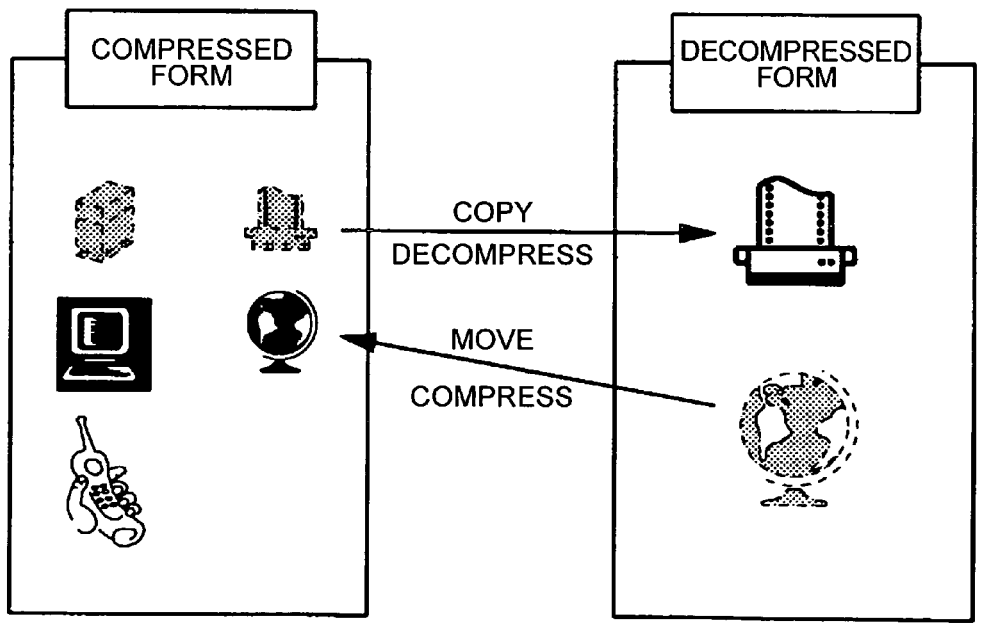

Referring to FIG. 21(b), in order to store material data in only one of the decompressed-data storage section 22 and the compressed-data storage section 24, the material data must be moved between the data storage sections 22 and 24. However, since there is no need for duplicate storage of the material data in the data storage sections 22 and 24, the limited storage space can be used effectively.

Figure 22:
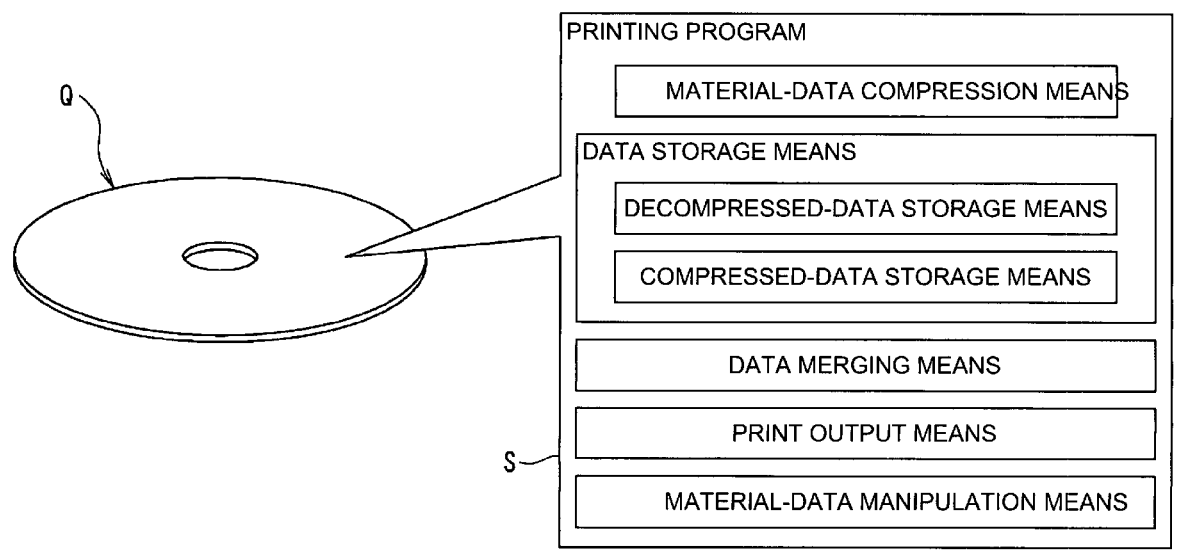
FIG. 22 is a schematic diagram of an example of a storage medium readable by computers in which a printing program according to the invention is recorded.

In execution of the processes of the embodiments, shown in the flowcharts of FIGS. 4, 5, 11, 12 and 13, in addition to using the control program stored in the ROM 130, a program S stored in a storage medium Q which indicates their procedures may be read into the RAM 120 for execution, as shown in FIG. 22. FIG. 22 is a schematic diagram of an example of the storage medium (CD-ROM) Q readable by computers, which stores various control programs S.

Examples of the storage medium Q include semiconductor memory media such as a RAM and a ROM, magnetic storage media such as an FD and HD, optical scanning storage media such as a CD, a CDV, an LD, and a DVD, and magnetic storage/optical scanning storage media such as an MO, which include all storage media readable by computers, irrespective of the electronic, magnetic, and optical scanning methods.

What is claimed is:

1. A printer comprising
a material-data compression/decompression section that performs at least one of compressing and decompressing rendered material data;
a data storage section storing the rendered material data;
a data merging section merging the material data stored in the data storage section in accordance with a print instruction to produce print data;
a print output section performing printing using the print data produced by the data merging section; and
a material-data manipulation section manipulating the material data, wherein the data storage section includes a compressed-data storage section storing the compressed material data and a decompressed-data storage section storing the decompressed material data; and
wherein the material-data manipulation section deletes select material data stored in the data storage section and stores the select material data in at least one of the compressed-data storage section and the decompressed-data storage section;
wherein the material-data manipulation section stores the select material data in the decompressed-data storage section in descending order of total usage count in the data merging section:
wherein the material-data manipulation section stores the select material data having a total usage count in the data merging section larger than a specified value, in the decompressed-data storage section;
wherein if an amount of material data stored in the decompressed-data storage section has exceeded a certain amount at the time of storing new material data into the decompressed-data storage section, the material-data manipulation section compares a total usage count of material data that is used the least of the material data stored in the decompressed-data storage section with the total usage count of the new material data to be stored, and wherein if the total usage count of the new material data to be stored is larger, the new material data is stored in place of the material data that is used the least.

2. The printer according to claim 1, wherein the material-data manipulation section manipulates a storage condition of the material data in accordance with user dictated instructions.

3. The printer according to claim 1, wherein: the material data comprises image data.

4. A computer-readable medium storing a program that causes a computer of a printer to serve as:
material-data compression/decompression means for at least one of compressing and decompressing rendered material data;
data storage means for storing the rendered material data;
data merging means for merging the rendered material data stored by the data storage means in accordance with a print instruction to produce print data;
print output means for performing printing by using the print data produced by the data merging means; and
material-data manipulation means for manipulating the material data,
wherein the data storage means serves as compressed-data storage means for storing the compressed material data and decompressed-data storage means for storing the decompressed material data; and
wherein the material-data manipulation means deletes select material data stored by the data storage means and stores the select material data in at least one of the compressed-data storage means and the decompressed-data storage means;
wherein if an amount of material data stored in the decompressed-data storage means has exceeded a certain amount at the time of storing new material data into the decompressed-data storage means, the material-data manipulation means compares a total usage count of material data that is used the least of the material data stored in the decompressed-data storage means with a total usage count of the new material data to be stored, and
wherein if the total usage count of the new material data to be stored is larger, the new material data is stored in place of the material data that is used the least.

5. A printing method in which multiple material data are stored in a data storage section of a printer in advance and the multiple material data are merged in the printer in accordance with a print instruction from a print instruction terminal, wherein the data storage section includes a compressed-data storage section storing compressed material data and a decompressed-data storage section storing decompressed material data, the method comprising the steps of:

rendering the multiple material data;

compressing the rendered multiple material data;

storing the compressed material data in the compressed-data storage section;

storing a part of the stored compressed material data in the decompressed-data storage section of the data storage section, the part being in a state in which the part is decompressed to an original size; and comparing a total usage count of material data that is used the least of the material data stored in the decompressed-data storage section with a total usage count of new material data to be stored when the amount of material data stored in the decompressed-data storage section has exceeded a certain amount at the time of storing the new material data into the decompressed-data storage section, wherein if the total usage count of the new material data to be stored is larger, the new material data is stored in place of the material data that is used the least.

6. The printing method according to claim 5, further comprising the step of:

displaying a material-data list of the material data stored in the data storage section of the printer on the print instruction terminal.

7. The printing method according to claim 5, further comprising the step of:

displaying a compressed-data display area corresponding to the compressed-data storage section of the data storage section of the printer and a decompressed-data display area corresponding to the decompressed-data display section of the data storage section of the printer on a display of the print instruction terminal;

producing icons corresponding to the material data stored in at least one of the compressed-data storage section and the decompressed-data storage section; and displaying the icons in one of the compressed-data display area and the decompressed-data display area depending on a position where the corresponding material data is stored.

8. The printing method according to claim 6, further comprising the step of:

manipulating a storage condition of the material data stored in the data storage section of the printer in synchronization with the manipulation of the material data displayed on the material-data list.

9. The printing method according to claim 7, further comprising the step of:

instructing a material-data manipulation section of the printer to manipulate the material data corresponding to an icon in synchronization with at least one of the operations of moving the icon between the compressed-data display area and the decompressed-data display area, registering the icon, and deleting the icon.

* * * * *